(12) United States Patent
Jung et al.

(10) Patent No.: US 9,578,185 B2
(45) Date of Patent: Feb. 21, 2017

(54) MOBILE TERMINAL AND METHOD OF CONTROLLING THEREFOR

(71) Applicant: LG ELECTRONICS INC., Seoul (KR)

(72) Inventors: Juhyun Jung, Seoul (KR); Yunghee Kim, Seoul (KR); Hojae Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/491,585

(22) Filed: Sep. 19, 2014

(65) Prior Publication Data

US 2015/0087357 A1    Mar. 26, 2015

(30) Foreign Application Priority Data

Sep. 23, 2013 (KR) .................. 10-2013-0112891

(51) Int. Cl.
*H04M 1/00* (2006.01)
*H04N 1/00* (2006.01)
*H04M 1/725* (2006.01)

(52) U.S. Cl.
CPC ....... *H04N 1/00106* (2013.01); *H04M 1/7253* (2013.01); *H04M 2201/38* (2013.01); *H04M 2250/52* (2013.01); *H04M 2250/64* (2013.01)

(58) Field of Classification Search
CPC ............ H04N 1/00106; H04M 1/7253; H04M 2250/64; H04M 2250/52; H04M 2201/38
USPC ....................................... 455/556
See application file for complete search history.

(56) References Cited

U.S. PATENT DOCUMENTS

| | | | |
|---|---|---|---|
| 2014/0354688 A1* | 12/2014 | Min .................. | G06T 19/006 345/633 |
| 2014/0364158 A1* | 12/2014 | Hwang ............. | H04W 4/185 455/466 |
| 2015/0169780 A1* | 6/2015 | Mishra ............ | G06F 17/0884 |

* cited by examiner

*Primary Examiner* — Tanmay Shah
(74) *Attorney, Agent, or Firm* — KED & Associates LLP

(57) ABSTRACT

The present invention relates to a mobile terminal enabling a user to more conveniently use the terminal and a method of controlling therefor. According to at least one of embodiments of the present invention, in case of transceiving an image using a wearable device of a glasses form, it may easily target an external device, which becomes a target with which the image is transceived.

22 Claims, 24 Drawing Sheets

FIG. 5
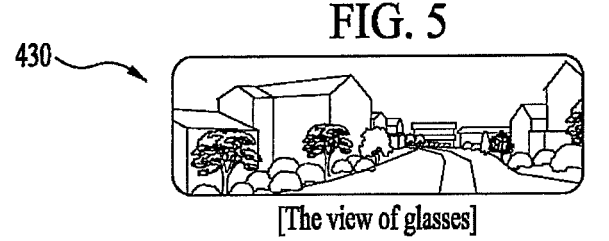
[The view of glasses]
(a)
short-press input
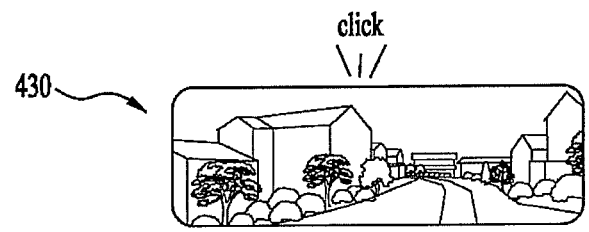
(b)
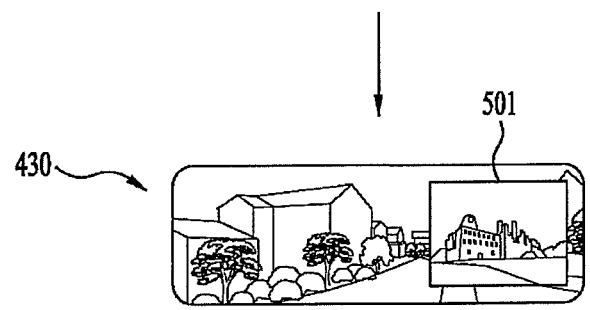
(c)
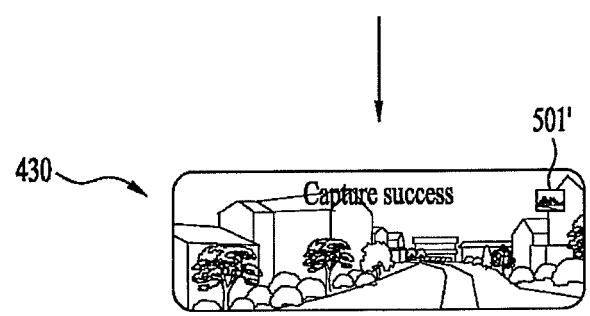
(d)

FIG. 6
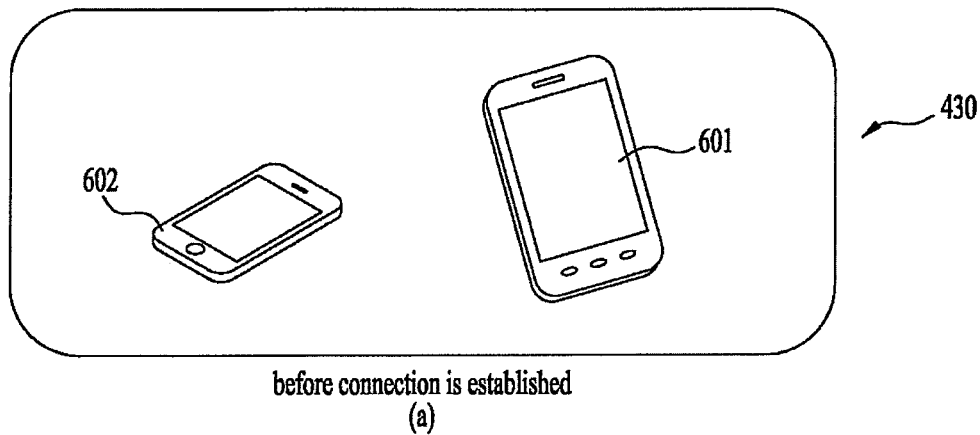
before connection is established
(a)
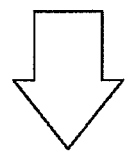
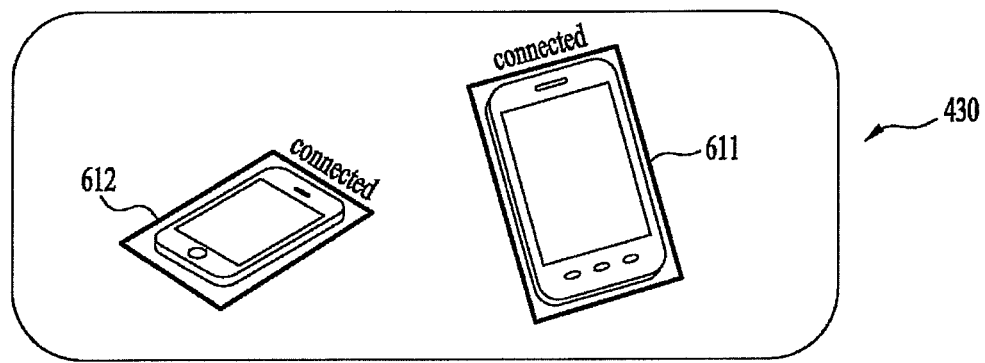
after connection is established
(b)

FIG. 7
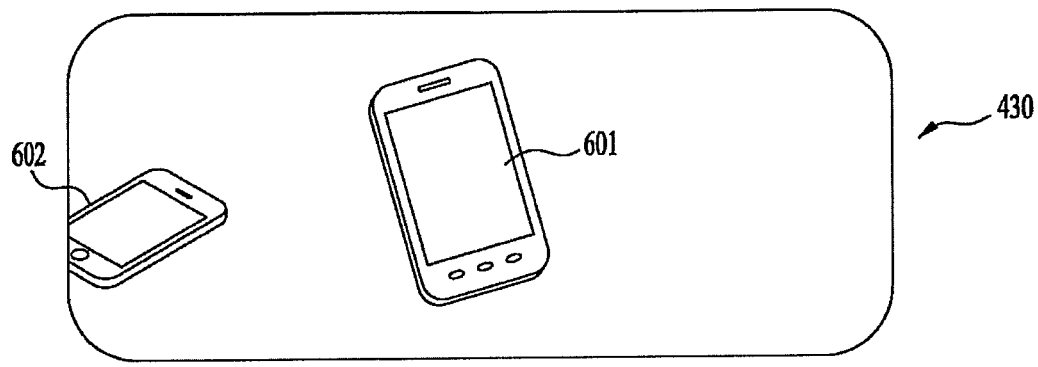
gazing at external device (601) for more than 5 seconds
(a)
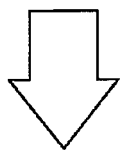
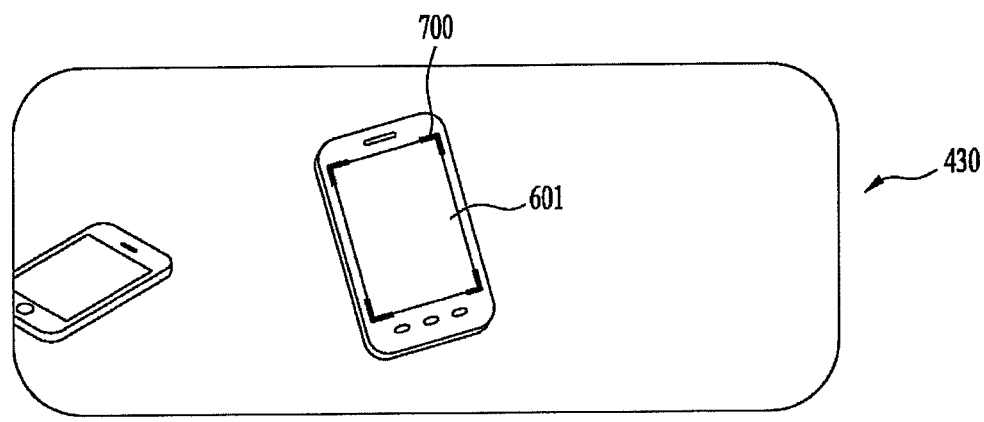
form focus on external device (601)
(b)

FIG. 9
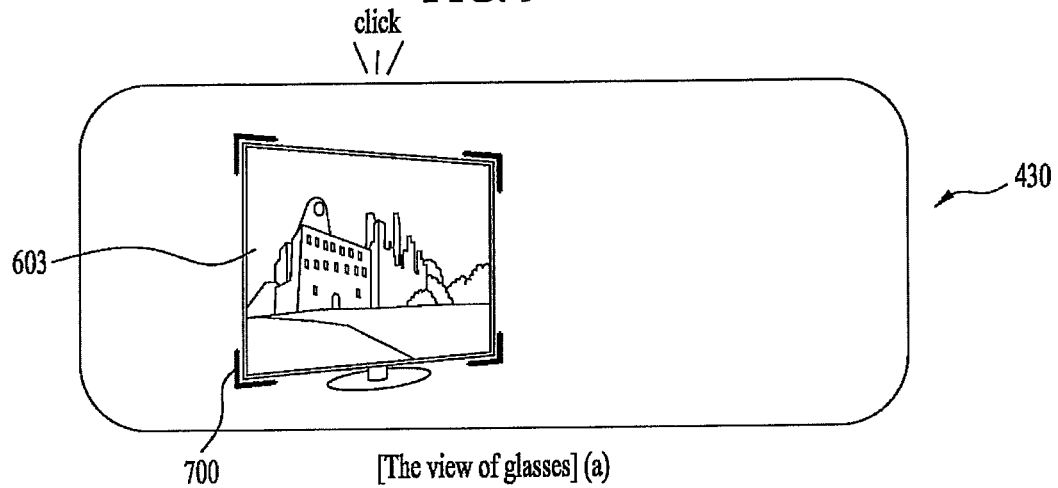
[The view of glasses] (a)
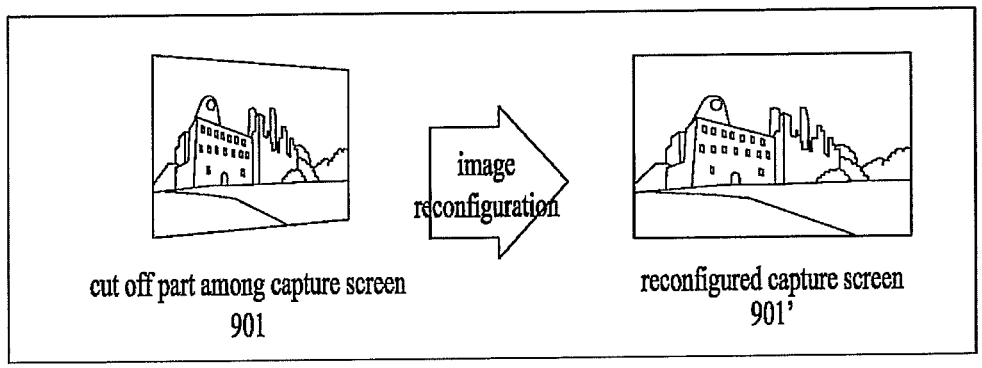
(b)
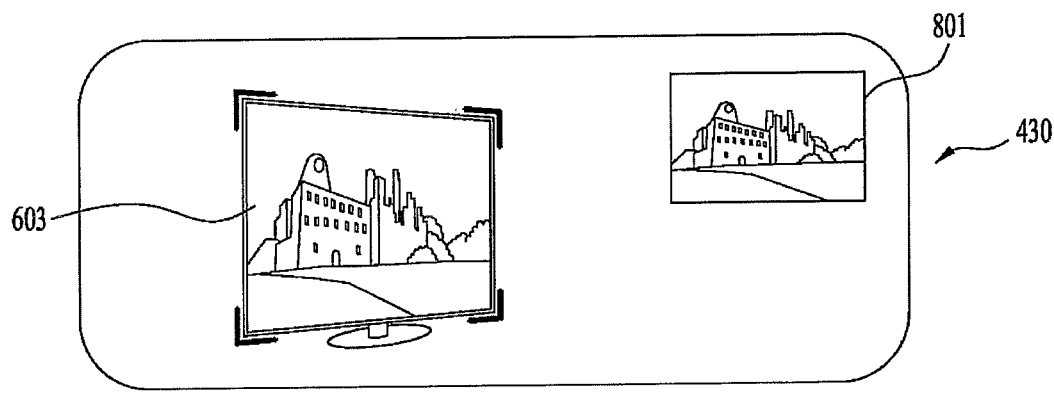
[The view of glasses] (c)

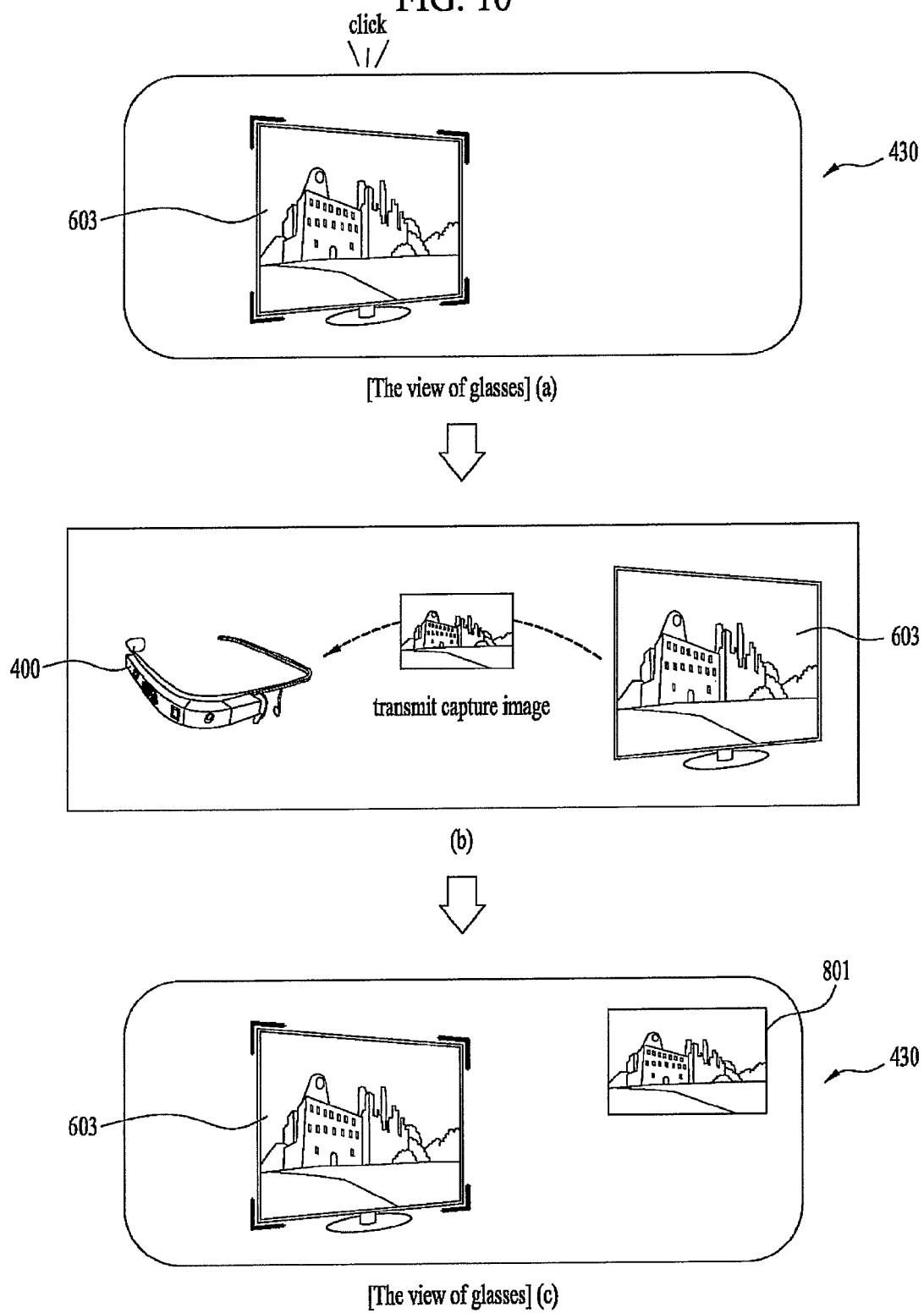

FIG. 11a
(a)
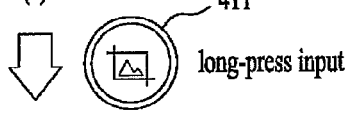 long-press input
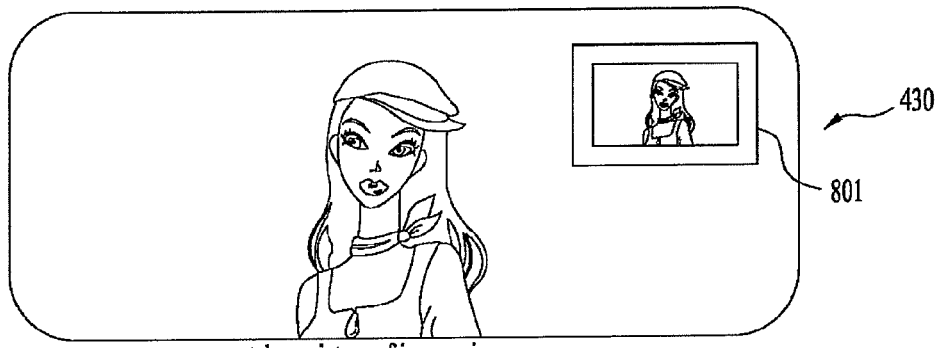
take a picture of image via camera
(b)
 maintain press
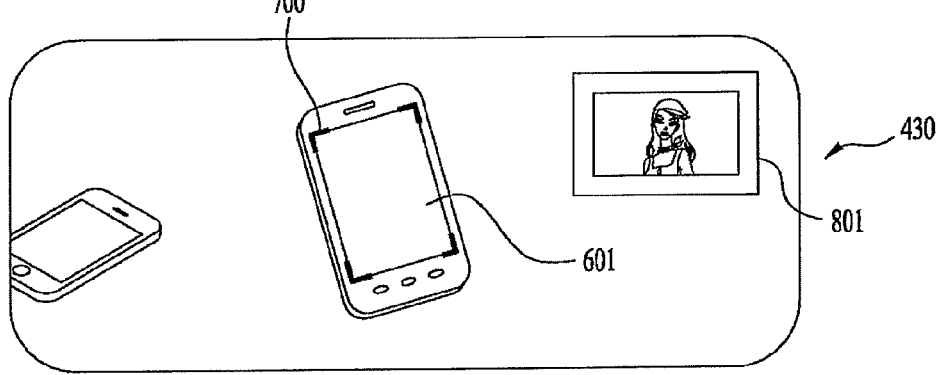
store capture image in clipboard
(c)
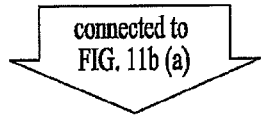
connected to
FIG. 11b (a)

FIG. 11b
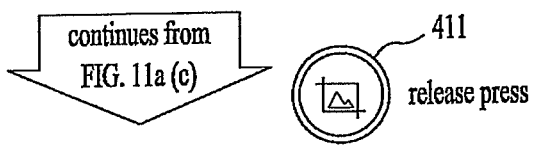
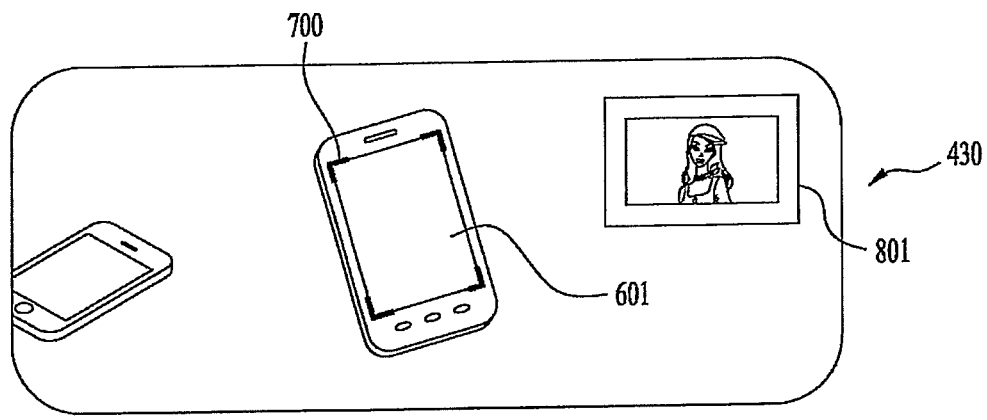
transmit camera image to
first external device (601)
(a)
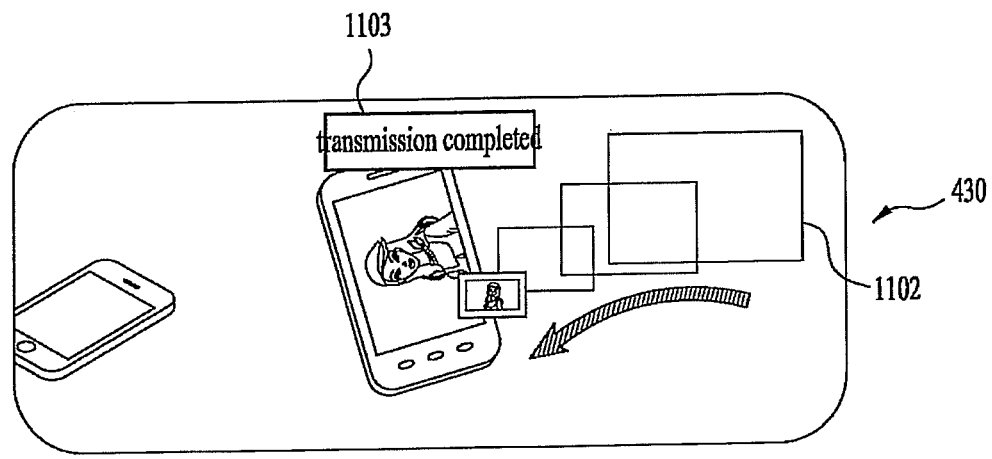
display animation effect showing that image
is transmitting to first external device
(b)

FIG. 12a
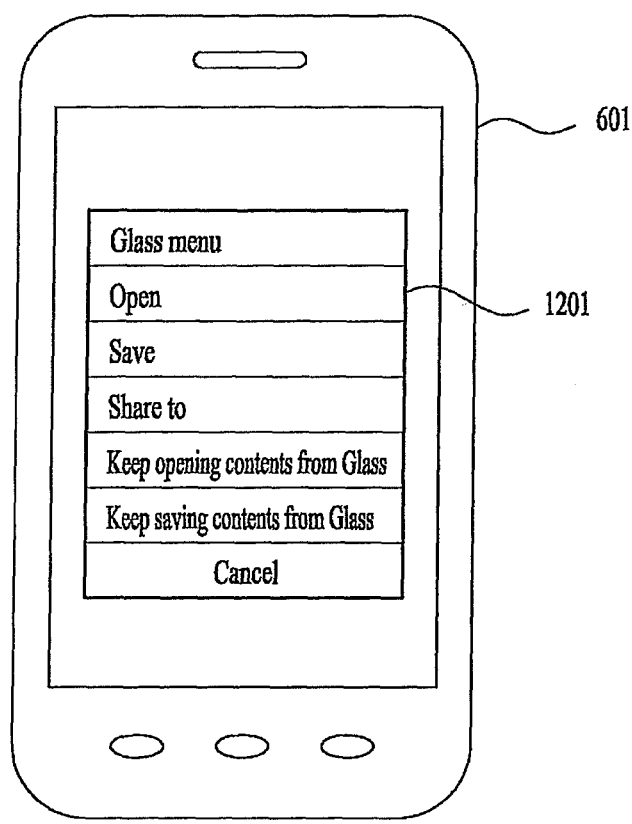
(a)
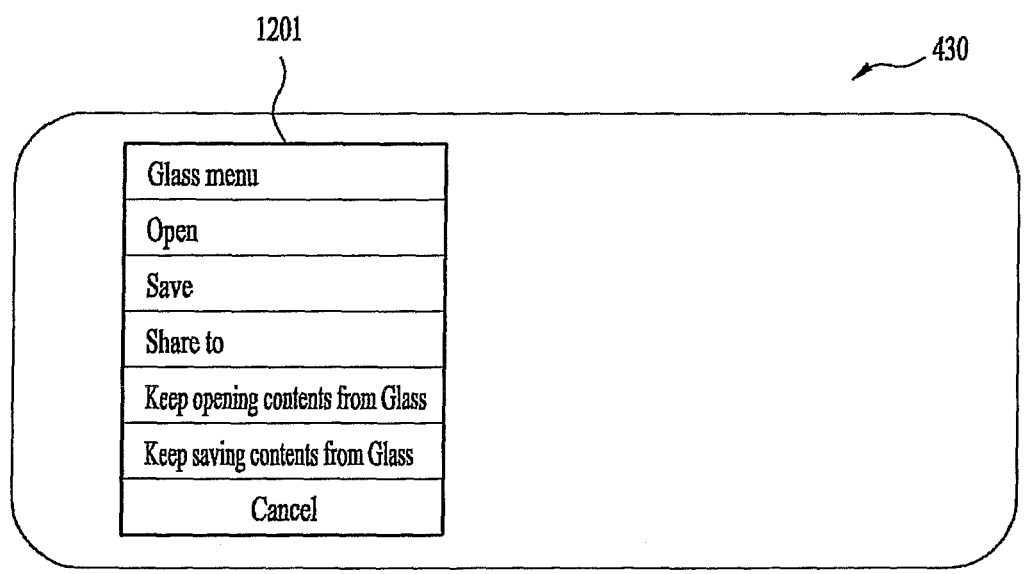
(b)

FIG. 13a
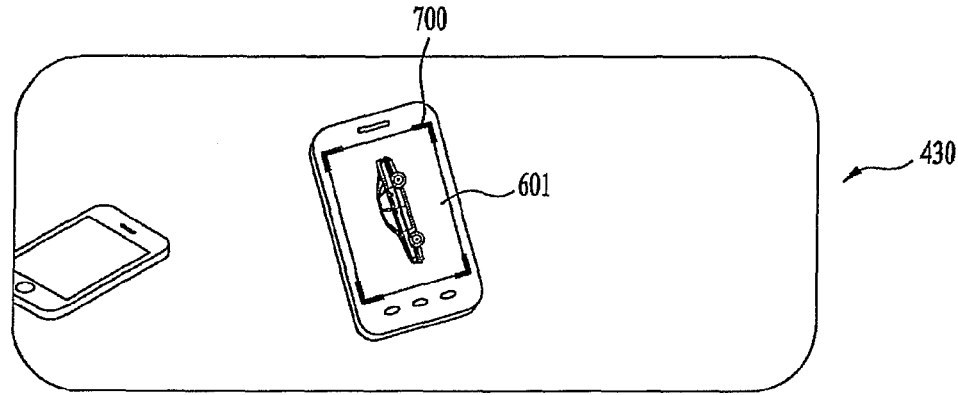
targeting on first external device (601)
(a)
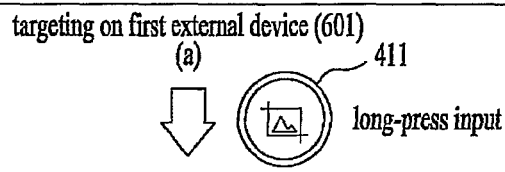
long-press input
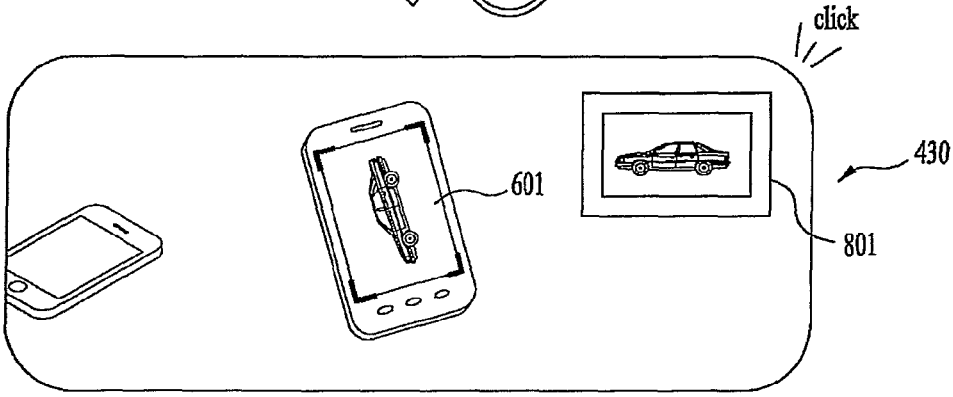
capture screen of first external device (601)
(b)
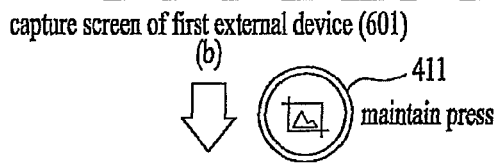
maintain press
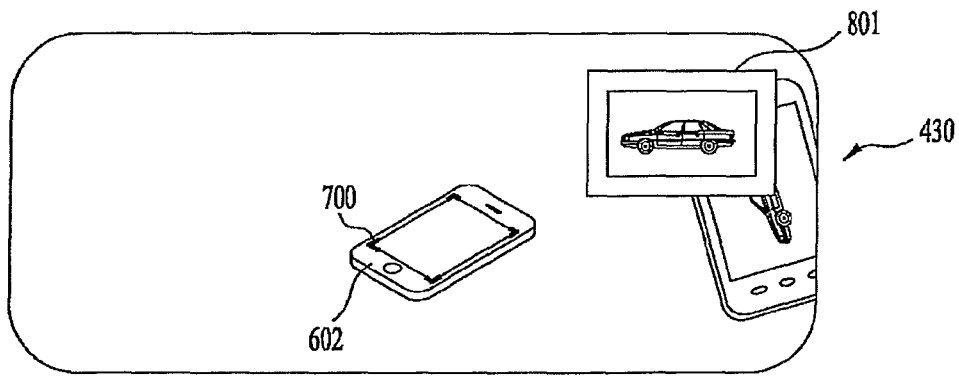
targeting on second external device (602)
(c)
connected to
FIG. 13b (a)

FIG. 13b
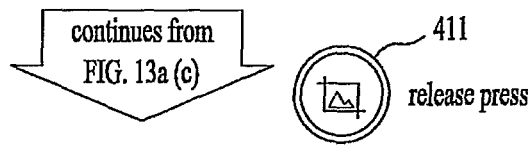
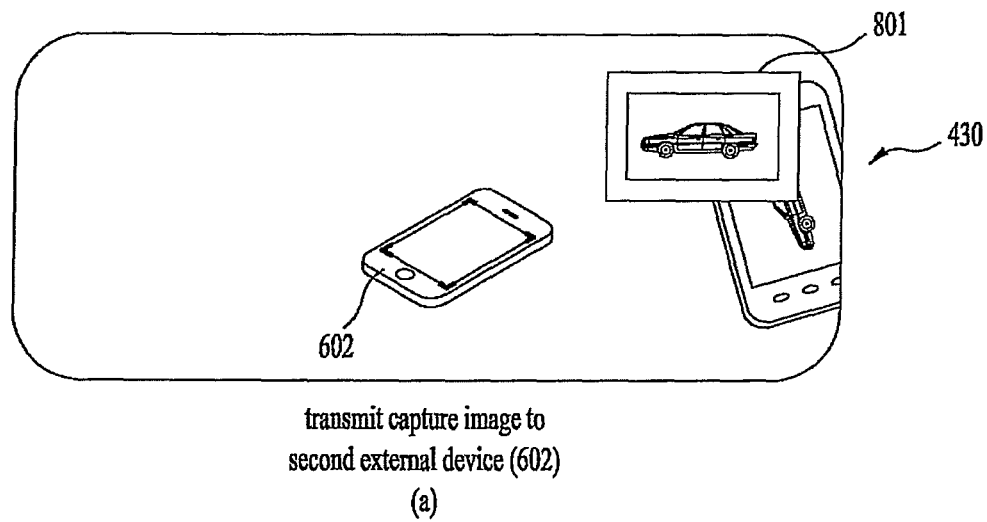
transmit capture image to
second external device (602)
(a)
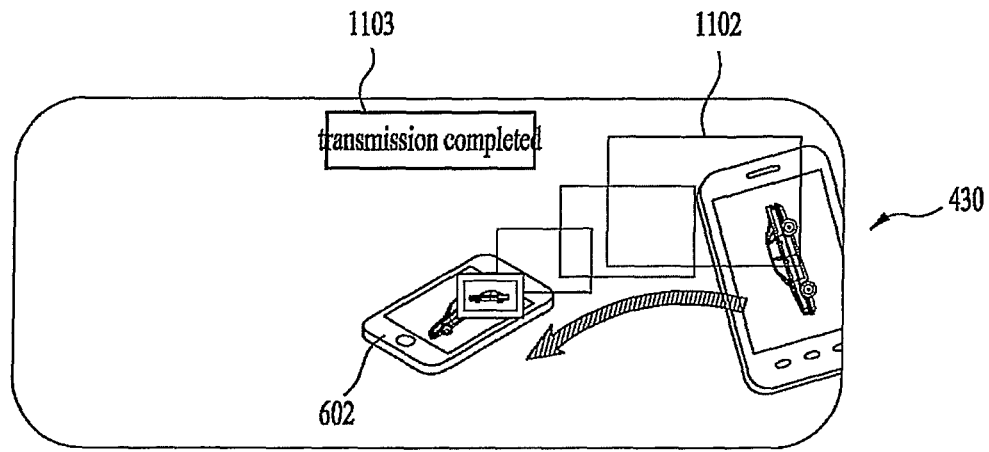
display animation effect showing that image is
transmitting to second external device (602)
(b)

FIG. 14a
(a)
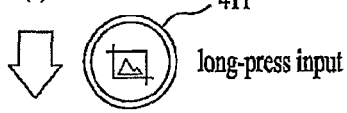
long-press input
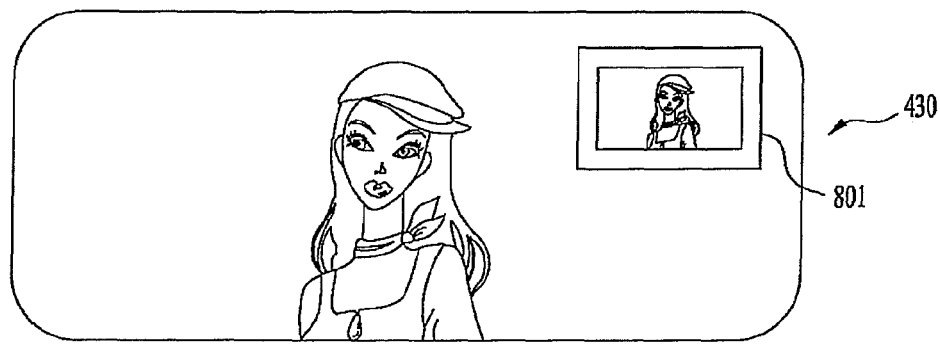
obtain camera image
(b)
maintain press
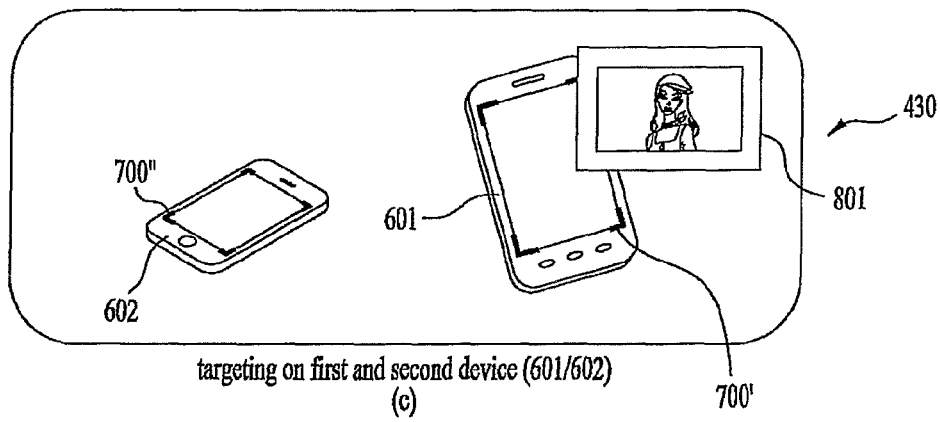
targeting on first and second device (601/602)
(c)
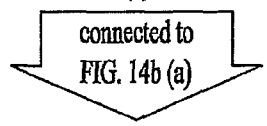
connected to
FIG. 14b (a)

FIG. 14b
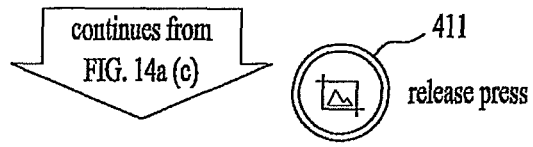
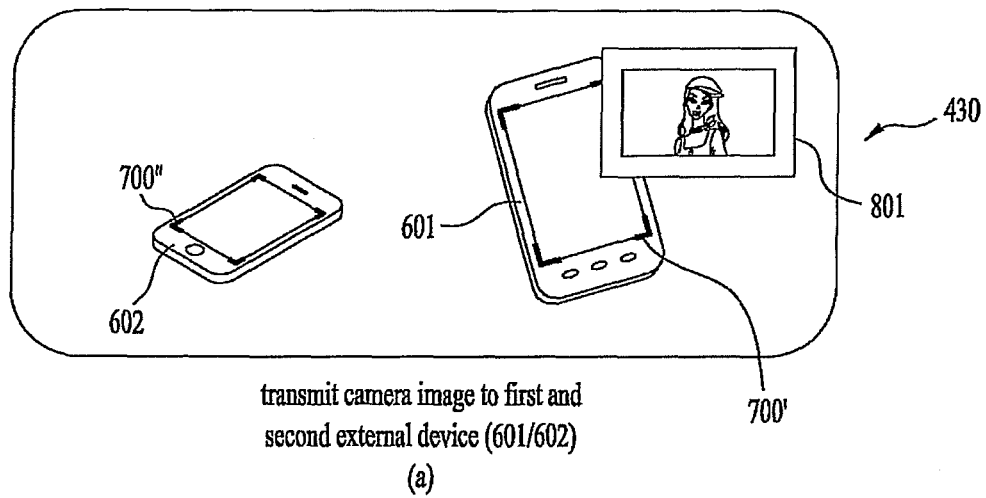
transmit camera image to first and
second external device (601/602)
(a)
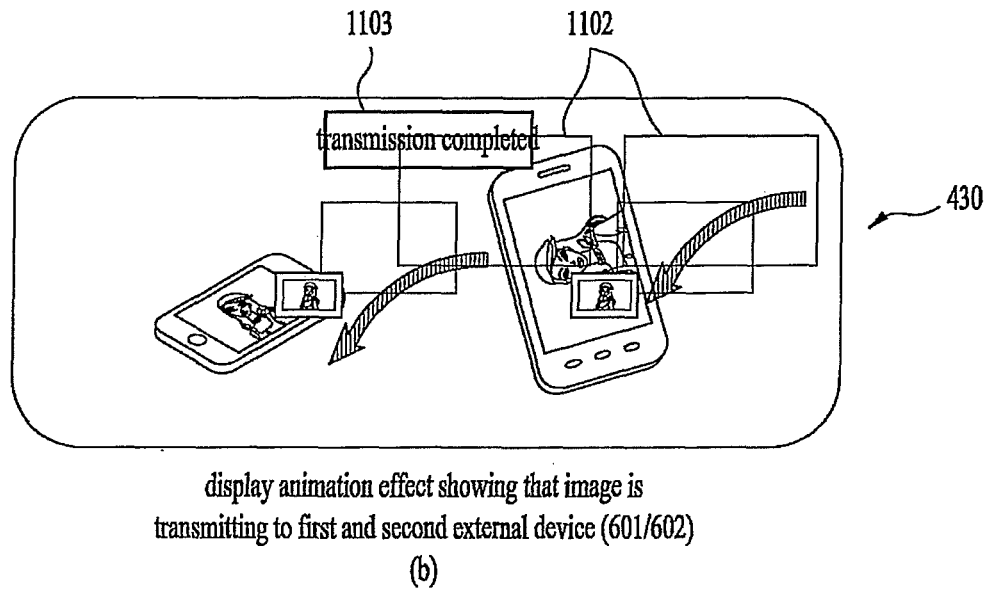
display animation effect showing that image is
transmitting to first and second external device (601/602)
(b)

FIG. 15
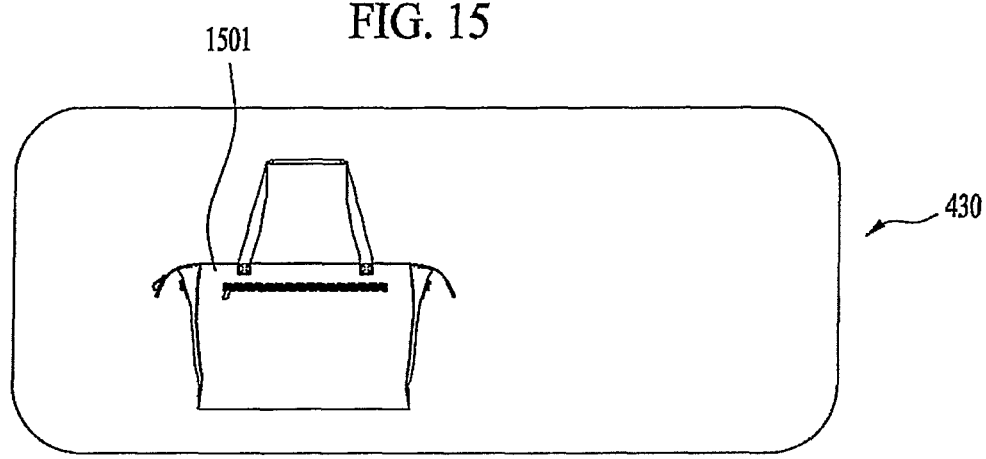
take a picture of item image
(a)
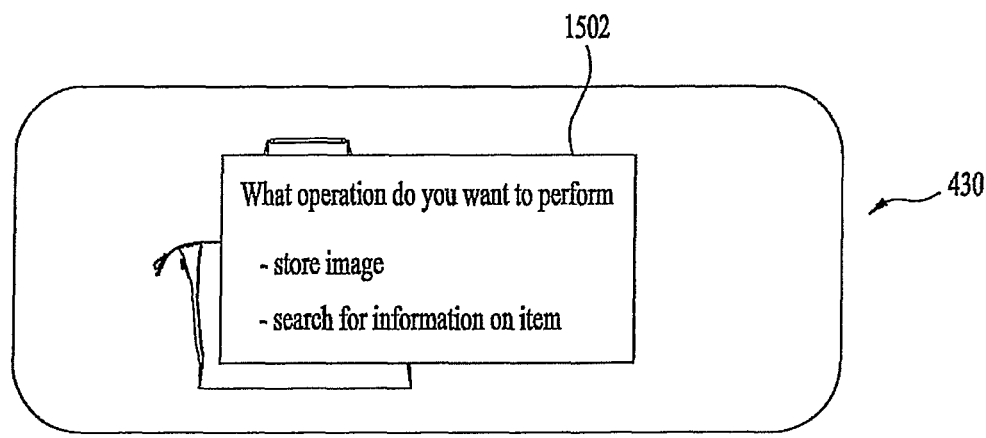
output operation selection pop-up window
(b)
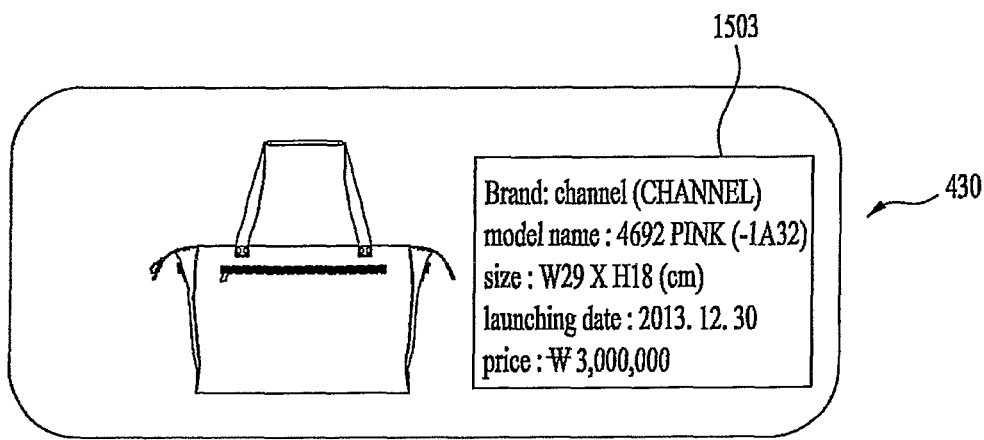
output information pop-up window for item
(c)

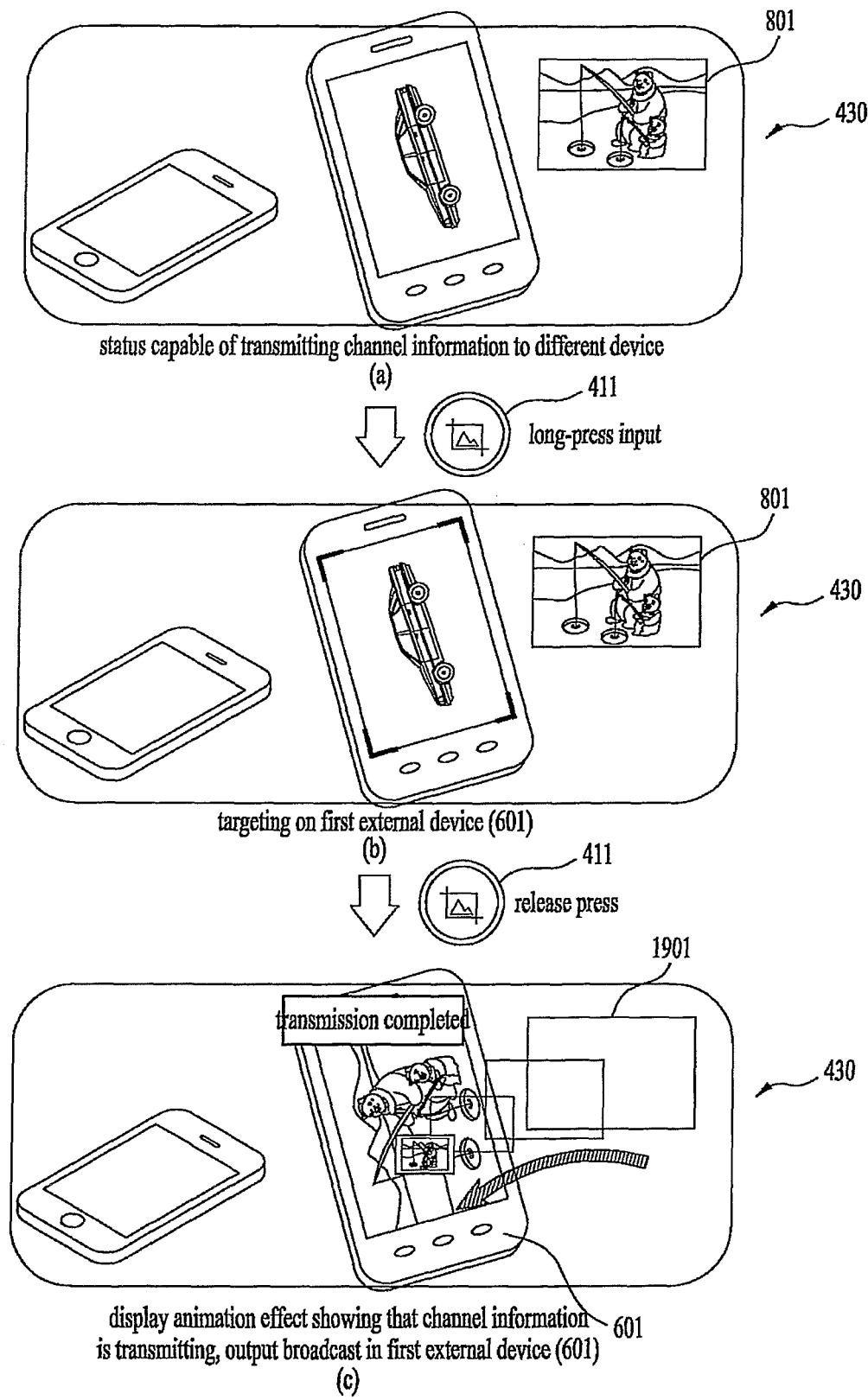

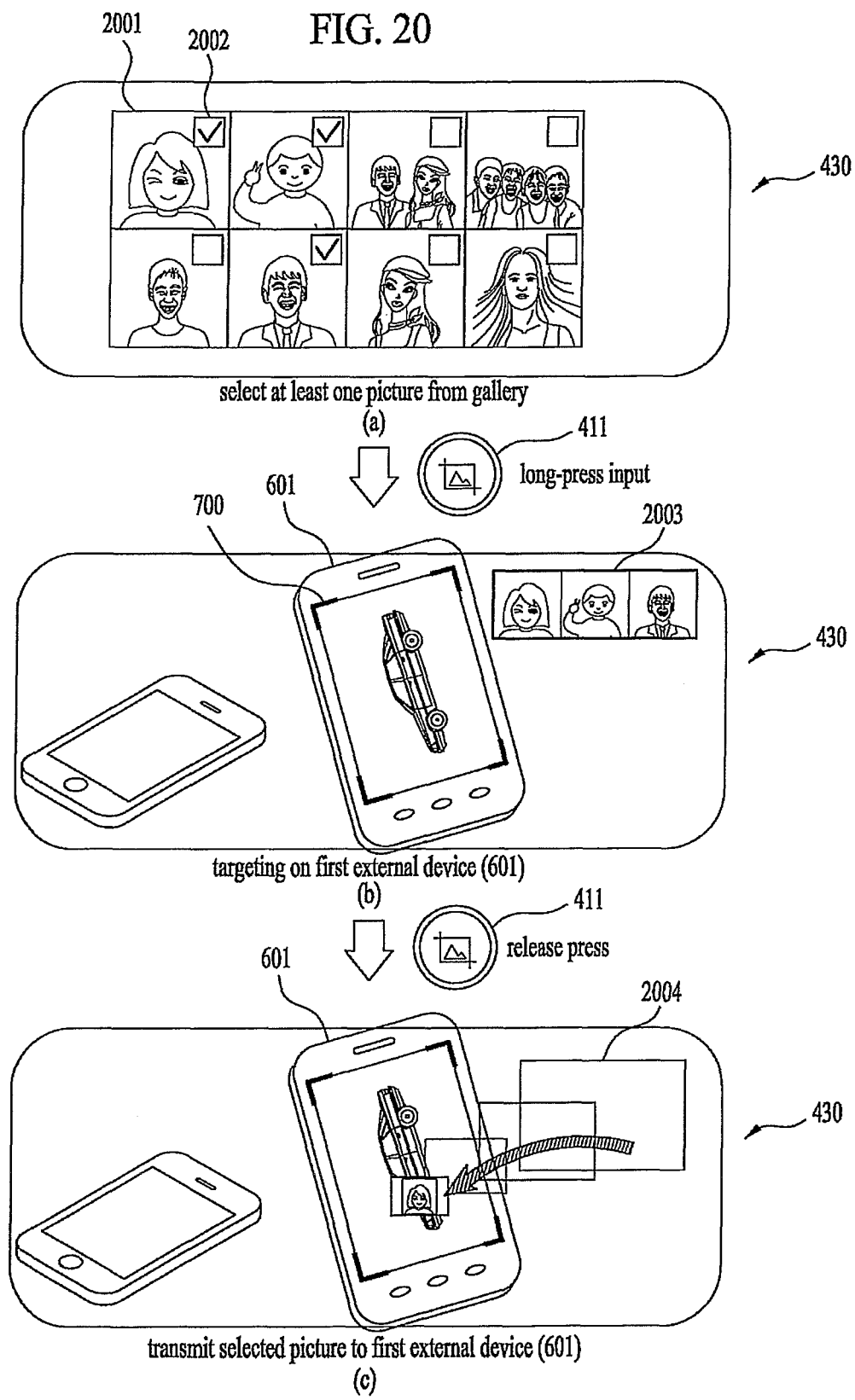

MOBILE TERMINAL AND METHOD OF CONTROLLING THEREFOR

CROSS-REFERENCE TO RELATED APPLICATION(S)

Pursuant to 35 U.S.C. §119(a), this application claims the benefit of earlier filing date and right of priority to Korean Application No. 10-2013-0112891, filed on Sep. 23, 2013, the contents of which are hereby incorporated by reference herein in their entirety.

BACKGROUND

1. Field

The present invention relates to a mobile terminal enabling a user to more conveniently use the terminal and a method of controlling therefor.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, inconvenience of operating a terminal is pointed out. In particular, it is a fair fact that if a hand or both hands are not free (in case of carrying an object by hands or in case of exercising/driving and the like), operating the terminal is inconvenience. Hence, a study on a new way of operating the terminal is under discussion. The study is focusing on a mobile terminal capable of being worn on a body of a person. This sort of terminal is called a wearable device (or wearable computer). Representative examples of the wearable device include a terminal of a watch form and a terminal of a glasses form.

Since those kinds of wearable devices are always worn on a part of a body of a user, there exists a merit in terms of mobility. On the contrary, since there exist a relatively small display and a limitation of a user input means, operation of the wearable devices may cause inconvenience.

Hence, it is necessary to perform a study on a wearable device enhancing user convenience in a manner of reducing inconvenience of operating the wearable devices and a method of controlling therefor.

SUMMARY OF THE INVENTION

Accordingly, the present invention is directed to an apparatus and method thereof that substantially obviate one or more problems due to limitations and disadvantages of the related art.

The present invention is proposed to satisfy the aforementioned necessity. One object of the present invention is to provide a mobile terminal of a glasses form enabling a user to obtain various kinds of images and easily deliver the obtained image using a limitative user input means and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a wearable mobile terminal can include a frame configured to be worn on a head of a user, a wireless communication unit configured to transceive data with at least one external device, a camera, an input unit and a controller configured to specify an external device based on at least one of a point of gaze of the user and a direction of the head, the controller configured to control the wireless communication unit to transmit a first image taken by the camera to a specified first external device in response to a first command received via the input unit.

To further achieve these objects and other advantages and in accordance with the purpose of the invention, as embodied and broadly described herein, a method of controlling a wearable mobile terminal includes the steps of specifying an external device based on at least one of a point of gaze of a user and a direction of a head of the user and if a first command is received via an input unit, controlling a wireless communication unit to transmit a first image taken by a camera to a specified first external device.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 5 is a diagram for a display status 430 in a first operation mode according to one embodiment of the present invention;

FIG. 6 is a diagram for one example of a method for a wearable device 400 according to one embodiment of the present invention to establish a connection with external devices coming into sight of a user;

FIG. 7 is a diagram for one example of a method for a wearable device 400 to specify (target) an external device according to one embodiment of the present invention;

FIG. 8 to FIG. 10 are diagrams for a method of obtaining a capture image of a screen outputted from a targeted external device according to one embodiment of the present invention;

FIG. 11a and FIG. 11b are diagrams for a control method of transmitting a camera image obtained by a camera to an external device according to one embodiment of the present invention;

FIG. 12a is a diagram for examples of a method of determining a following operation for a transmitted image according to one embodiment of the present invention.

FIG. 13a and FIG. 13b are diagrams for a method of transmitting a capture image of a screen outputted from an external device to a different external device according to one embodiment of the present invention;

FIG. 14a and FIG. 14b are diagrams for a method of transmitting a camera image obtained by a camera 428 to a plurality of external devices according to one embodiment of the present invention;

FIG. 15 is a diagram for an example of a method of displaying information on an item included in a camera image among controlling methods according to one embodiment of the present invention;

FIG. 19 is a diagram for an example of a method of delivering received channel information to a different external device according to one embodiment of the present invention;

FIG. 20 is a diagram for a method of transmitting an image stored in a memory 160 of a wearable device 400 according to one embodiment of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
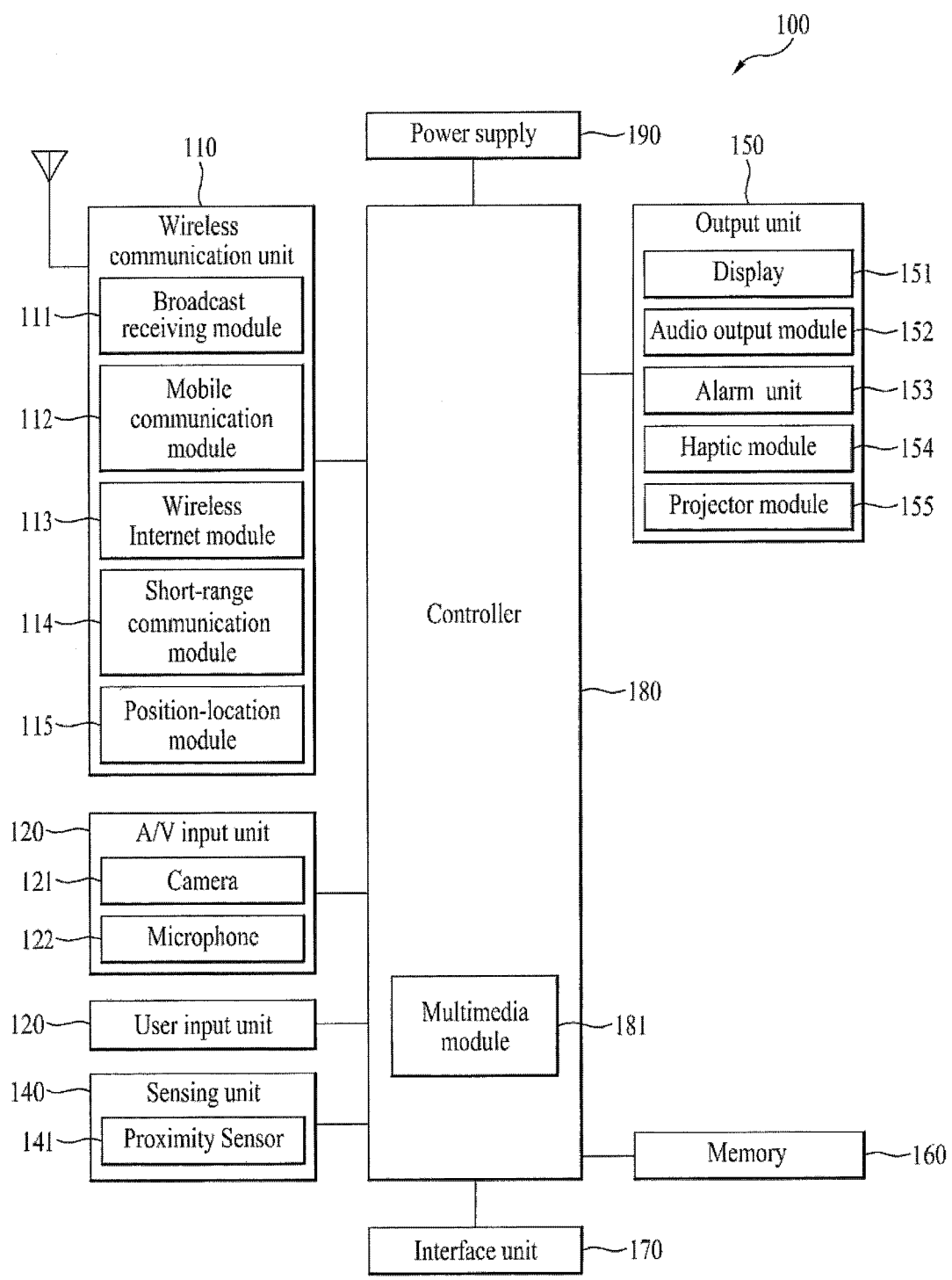
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Gobal System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (NV) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event.

The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
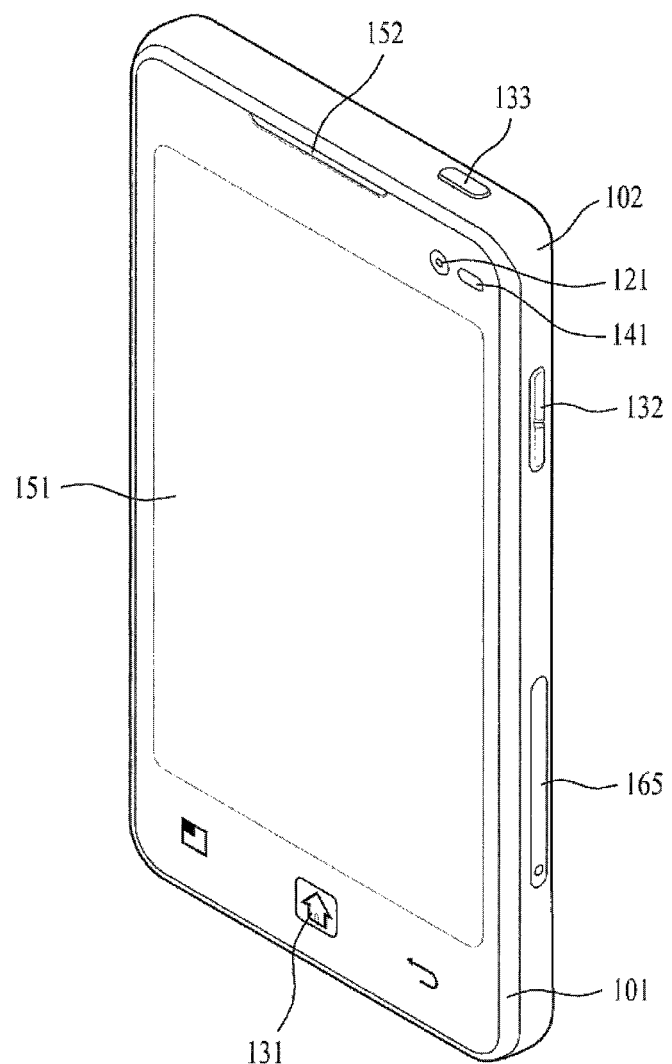
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
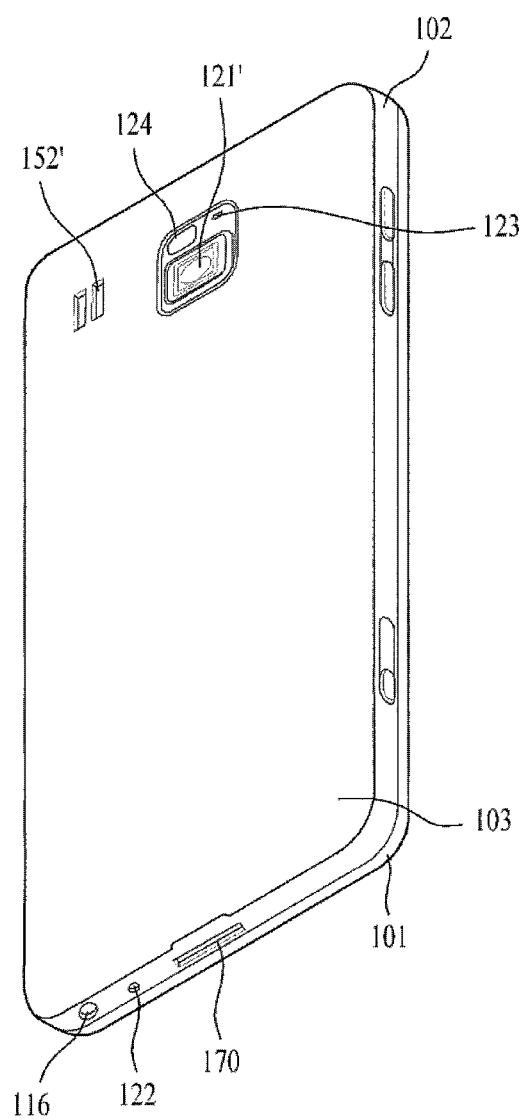
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
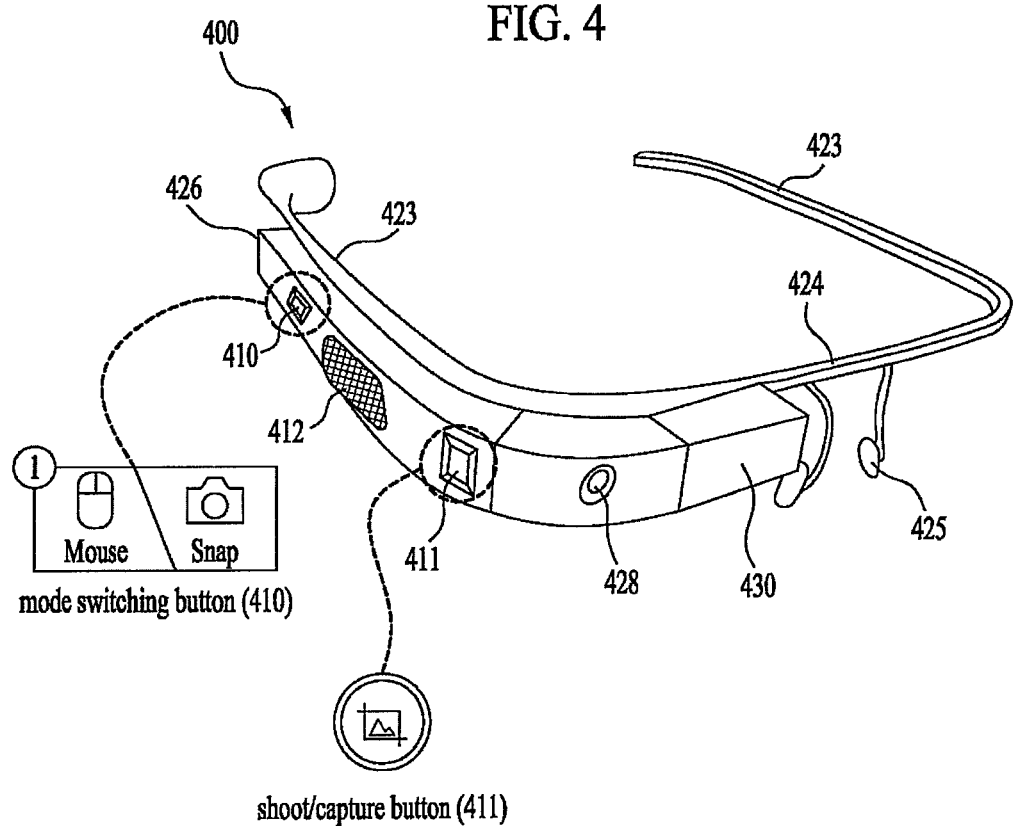
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

FIG. 5 is a diagram for a display status 430 in a first operation mode according to one embodiment of the present invention. The "first operation mode" explained in one embodiment of the present invention indicates a mode of obtaining an image of a prescribed moment by a method of taking a picture or capturing and storing or transmitting the image to a different device. In this case, "capturing" corresponds to an operation of a prescribed terminal equipped with a display, which stores a screen itself displayed via the display as an image.

In one embodiment of the present invention described in the following, an image obtained by "shooting" of a camera is called a camera image and an image obtained by "capturing" is called a capture image.

After obtaining the aforementioned camera image and/or the capture image, the image can be stored in a memory 160. The camera image and/or the capture image can be automatically deleted from the memory 160 when a predetermined prescribed time elapses from the storing.

In drawings of the present invention, a form (the temples, a bridge of glasses and the like) constructing the exterior of a wearable device 400 is omitted. Instead, the drawings of the present invention shows a vision (the aforementioned normal vision) of a user wearing the wearable device 400 facing the outside via a transparent display 430 and an output status of the transparent display 430 only. In the following description, although the present invention is described on the basis of the transparent display 430, as mentioned in the foregoing description, if the normal vision and the output status of the display 430 are provided in a manner of being duplicated, a type of the display 430 may be non-limited by the transparent display.

Referring to FIG. 5 (a), an image of an outdoor panorama is seen via the transparent display 430. If a shooting command is received, the controller 180 can store a camera image corresponding to an image obtained by a camera 428. As an example of the shooting command, the shooting command may correspond to a short-press input for a shoot/capture button 411. As mentioned in the foregoing description, since the camera 428 is facing a direction identical to a direction of a vision of a user or a direction of a head of the user while positioning at the front part of the wearable device 400, if the wearable device is put on the user, the camera can obtain an image which is matched with the vision of the user.

In particular, as depicted in FIG. 5 (b), if the input of shortly pressing the shoot/capture button 411 is received, the controller 180 can control the camera 428 to take a picture and can output a preview 501 of a shot image in one area of the transparent display 430 as depicted in FIG. 5 (c). And, the controller can output an animation effect (e.g., an animation effect showing that an area of the preview 501 is gradually reducing) 501' showing that the camera image is stored while outputting a message (capture success) indicating that the image shooting is successful.

Meanwhile, although the embodiment mentioned earlier with reference to FIG. 5 simply explains an operation of obtaining a single image using the camera 428 only, a plurality of images taken with a prescribed interval (or a video for a prescribed time) can be obtained according to a prescribed command. For instance, the controller 180 can take a picture of a plurality of the images in proportion to time of inputting the shoot/capture button 411.

Meanwhile, one embodiment of the present invention proposes to specify (target) an external device coming into sight of a user and obtain a capture image of a screen outputted from the specified external device except an operation of shooting an image, which is matched with the vision of the user. According to one embodiment of the present invention, an operation of specifying an external device may correspond to an operation of designating the external device as a target with which the wearable device 400 transceives a prescribed data. The operation of specifying the external device can be performed by a user selection according to a method described in detail in the following. As mentioned in the foregoing description, an operation of designating a target with which data to be transceived can be represented as targeting the target in one embodiment of the present invention.

As a prerequisite of the targeting, it is necessary for a device to be connected with a corresponding external device via a wireless communication system (mainly, a short-range communication) to transceive data with the external device. For instance, assume that the wearable device 400 according to one embodiment of the present invention is connected with a targeted external device via Bluetooth communication.

FIG. 6 is a diagram for one example of a method for a wearable device 400 according to one embodiment of the present invention to establish a connection with external devices coming into sight of a user.

FIGS. 6 (a) and (b) show visions at which a user wearing the wearable device 400 is looking via the transparent display 430. A first and a second external device 601/602 are seen via the transparent display 430. FIG. 6 (a) shows a state that the wearable device 400 is not connected with the first and the second external device 601/602 and FIG. 6 (b) shows a state that the wearable device 400 is connected with the first and the second external device 601/602.

The controller 180 according to one embodiment of the present invention identifies neighboring external devices and can establish connections with the identified neighboring external devices via a wireless communication system. Having established the connection, the external devices can output indicators 611/612 indicating that the connection has been established via the transparent display 430. In one embodiment of the present invention, assume that one or more external devices are connected with the wearable device 400 via the wireless communication system.

FIG. 7 is a diagram for one example of a method for a wearable device 400 to specify (target) an external device according to one embodiment of the present invention.

One embodiment of the present invention proposes to detect at least one selected from the group consisting of a movement of eyes of a user, a position of the eyes and a direction at which a glasses is facing and target an external device using a detected result.

Referring to FIG. 7 (a), if a gaze of the user stays at the first external device for more than a prescribed time, the controller 180 can target the first external device 601. As mentioned in the foregoing description, the controller 180 can determine the gaze of the user based on not only an eye tracking sensor but also an image obtained by a camera 428.

FIG. 7 (b) shows a state of the transparent display 430 in case that the first external device 601 is targeted. The controller 180 can output a focus indicator 700 indicating that the first external device 601 is targeted via the transparent display 430.

Meanwhile, as mentioned in the foregoing description, in order to target an external device by detecting at least one selected from the group consisting of a movement of eyes of a user, a position of the eyes and a direction at which a glasses is facing, a more elaborate augmented reality should be provided.

According to one embodiment of the present invention, it may be required to have an additional sensing operation to provide the elaborate augmented reality. This is because in order for the mobile terminal 100 to provide an augmented reality, it is necessary to identify a specific position of a target.

In case of a general augmented reality, correct coordinates information of the mobile terminal 100 obtained via a GPS module, the extent of tilt (i.e., a direction at which a camera is facing) of the mobile terminal 100 obtained via a gyroscope sensor, coordinates information of a target (e.g., a specific coffee shop) and the like can be used. In particular, a 3D position of a target in a general augmented reality can be identified using coordinates information of the target. And, in this case, the target may correspond to such a target including a fixed position as a specific store, a tourist attraction, a building, or the like. Hence, the mobile terminal 100 can identify the position of the target in a manner of storing coordinate information of the target in advance or receiving/updating the coordinate information of the target existing in the vicinity of the mobile terminal 100 by accessing a web.

Yet, a target of the augmented reality proposed by one embodiment of the present invention corresponds to not a place including a fixed position but a terminal capable of moving its position. Hence, it is necessary to identify a position of an augmented reality target using additional information instead of coordinate information of the target.

In case of an augmented reality according to one embodiment of the present invention, the controller 180 can identify a position of a target using a camera image obtained by a camera 428. For instance, assume that there exist a TV and a mobile terminal as external devices connected with the wearable device 400 according to one embodiment of the present invention. If a shape of the mobile terminal is captured in an image obtained by the camera 428, the controller 180 may determine as the mobile terminal exists in a position of the shape.

In case of the augmented reality according to one embodiment of the present invention, the controller 180 can identify a position of a target based on a connected wireless communication system. In particular, the controller identifies a strength of a signal transceived via the wireless communication system to identify a distance between the wearable device and a connected external device. By doing so, the controller can identify the position of the target.

And, in case of the augmented reality according to one embodiment of the present invention, the controller 180 can identify a position of a target in a manner of recognizing a screen outputted from a connected external device. In particular, the controller 180 periodically (one time or aperiodically) transceives a capture image of the screen outputted from the external device using the wireless communication system connected with the external device. And then, the controller can identify the position of the external device (target) by searching for an external device outputting a screen corresponding to the received capture image. Or, the position of the connected external device can be identified in a manner that the external device outputs a screen which is promised in advance and the wearable device 400 recognizes the screen.

If the position of the external device is identified one time, recognition of the external device can be sustained in a manner of tracking the shape of the external device using the camera 428.

Moreover, the external device can consistently inform the wearable device of a position of the external device in a manner of installing an identification module in the external device itself and continuously transceiving data with the wearable device 400.

Regarding the aforementioned methods capable of identifying a position of a target, the position of the target can be identified using one method or can be identified by comprehensively considering various methods.

The method of identifying a position of a target may be non-limited to the above-mentioned method. It is apparent that a different method for identifying a position of a target to provide an augmented reality can be applied to one embodiment of the present invention.

In embodiments of the present invention described in the following, assume that a position of a target can be identified using the aforementioned augmented reality technology.

Figure 8:
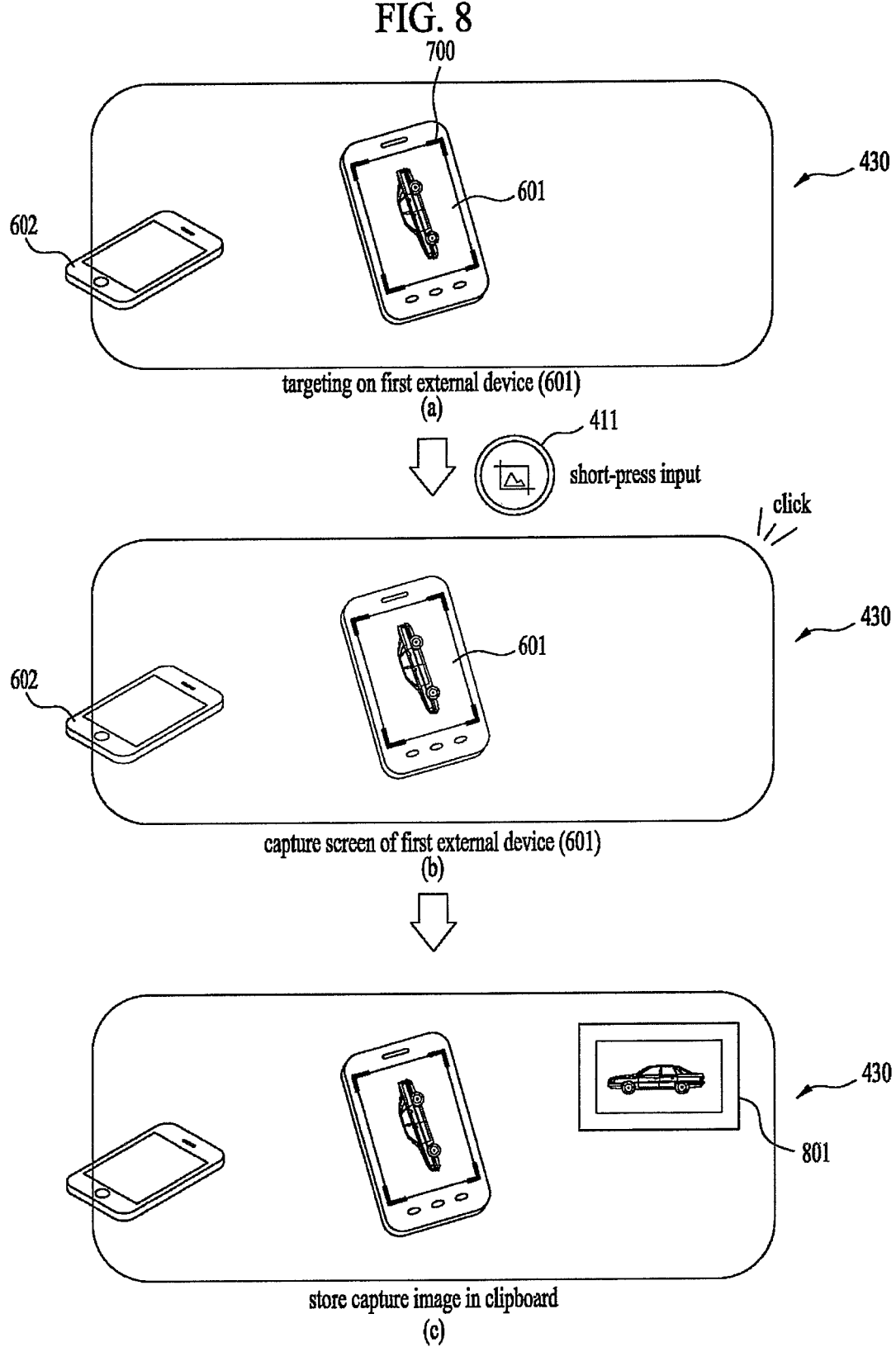

FIG. 8 to FIG. 10 are diagrams for a method of obtaining a capture image of a screen outputted from a targeted external device according to one embodiment of the present invention.

Referring to FIG. 8 (a), assume that a focus is formed on a first external device 601 by the aforementioned method (i.e., assume that the wearable device 400 has targeted the first external device 601 according to a command of a user). In doing so, the controller 180 can display a focus indicator 700 in a position of the first external device 601 on the transparent display 430.

When a focus is formed on the first external device, if a shooting command is received from the user, the controller 180 obtains a capture image (hereinafter first external device capture image) of a screen outputted from the first external device. Moreover, if the capture image is obtained, the controller can output a vibration or a sound (e.g., a beep sound or a guide ment) to inform the user of the acquisition of the capture image.

A method of obtaining a capture image from an external device is explained with reference to FIG. 9 and FIG. 10 in the following.

FIG. 9 shows an example of a method of obtaining a capture image (hereinafter a third external device capture image) of a third external device 603.

The controller 180 takes a picture of a camera image corresponding to a vision of a current user using a camera 428, cuts off a region outputted from the third external device 603 from the obtained camera image 901 and reconfigures 901' an image of the cut off region to obtain the third external device capture image (refer to FIG. 9). As depicted in FIG. 9 (c), the controller 180 can output a preview 801 of the obtained third external device capture image in one area of the transparent display 430.

FIG. 10 shows a different example of the method of obtaining the third external device capture image.

As depicted in FIG. 10(b), the controller 180 transmits a request signal to the third external device 603 and can directly receive the third external device capture image from the first external device.

As depicted in FIG. 10 (c), the controller 180 can output a preview 801 of the obtained third external device capture image in one area of the transparent display 430.

A method of obtaining a capture image outputted from an external device has been explained in FIG. 8 to FIG. 10. The capture image can include not only an image for a whole screen outputted from the external device but also an image for a prescribed area of the screen outputted from the external device. On the contrary, an example for a control method of transmitting a camera image (or a capture image) to an external device is explained in FIG. 11 in the following.

FIG. 11a and FIG. 11b are diagrams for a control method of transmitting a camera image obtained by a camera to an external device according to one embodiment of the present invention.

As depicted in FIG. 11 (a), if a command for transmitting a camera image to a targeted external device is received, the controller 180 obtains the camera image using the camera 428 and transmits the camera image to the targeted external device. In this case, the command for transmitting the camera image to the targeted external device may correspond to a long-press input. In particular, after the input is received, the command may correspond to the long press input that the input is released when the external device is targeted.

More specifically, if the long-press input inputted on a shoot/capture button 411 is received, the controller 180 obtains a camera image via the camera 428. And, the controller 180 can display a preview 801 of the camera image in one area of the transparent display 430. The controller 180 can continuously maintain the output of the preview 801 while the long-press input is maintained.

Subsequently, the controller 180 can target a first external device 601 while the long-press input is maintained. As depicted in FIG. 11b (a), if the long-press input is released when the first external device is 601 is targeted, the controller 180 can transmit the camera image to the first external device 601.

As depicted in an example of FIG. 11b (b), the controller 180 can output an animation effect 1102 showing that the camera image is transmitted to the first external device 601.

Meanwhile, although a method of transmitting an image to a targeted external device on timing of releasing the long-press is explained in FIG. 11a and FIG. 11b, there may not exist the targeted external device on the timing of releasing the long-press. In this case, the controller 180 can control the touch screen 430 to display a guide message indicating that there is no targeted external device on the timing of releasing the long-press. In addition, if the long-press input inputted on the shoot/capture button 411 is received again from a user within a prescribed time, the controller may resume a transmission operation for the previously obtained camera image.

Having received the camera image, the first external device 601 may perform various operations for the received image. For instance, the first external device may store the received image or may directly display the received image. In order to determine a specific operation, a user can select the specific operation using a pop-up window outputted according to one embodiment of the present invention. Regarding this, it shall be described with reference to FIG. 12 in the following.

FIG. 12a is a diagram for examples of a method of determining a following operation for a transmitted image according to one embodiment of the present invention. Referring to FIG. 12a (a), the first external device 601, which has received an image, outputs a pop-up window 1201 to make a user select a specific operation. Referring to FIG. 12a (b), the display 430 of the wearable device 400, which has transmitted the image, outputs a pop-up window.

In particular, either a transmitting side of the image or a receiving side of the image or both the transmitting side of the image and the receiving side of the image can output the pop-up window 1201. A selection of a user can be received via the outputted pop-up window 1201. An item of the pop-up window shown in FIG. 12a can include at least one selected from the group consisting of "open", "save", "share to", "keep opening contents from glasses" (for a prescribed time) and "keep saving contents from glasses" (for a prescribed time). In the following, a detail operation of each item is explained.

Open: if an image is received from the wearable device 400, the first external device 601 displays the received image via a screen of the first external device 601. If the image is received when power of the screen of the first external device is turned off, the first external device 601 can display the image after the power is turned on.

Save: if an image is received from the wearable device 400, the first external device 601 stores the received image in a memory of the first external device 601.

Share to: if an image is received from the wearable device 400, the first external device 601 can automatically deliver the received image to a counterpart, which is stored in advance.

keep opening contents from glasses (for a prescribed time): regarding all images received during a predetermined time (or a time configured by a user), the aforementioned "open" operation can be performed.

keep saving contents from glasses (for a prescribed time): regarding all images received during a predetermined time (or a time configured by a user), the aforementioned "save" operation can be performed.

As depicted in FIG. 12a (a), if an image is received, the first external device 601 outputs a pop-up window 1201 and a user selects an item. And, the first external device 601 can perform an operation for the received image based on the selected item.

As depicted in FIG. 12a (b), if an image is transmitted, the wearable device 400 outputs a pop-up window 1201 and a user selects an item. And, the wearable device 400 can transmit a process operation command for the transmitted image to the first external device 601 based on the selected item. Having received the process operation command, the first external device 601 can perform an operation for the received image based on the received process operation command.

Meanwhile, besides the items included in FIGS. 12 (a) and (b), if there is an image previously outputted by the external device, which has received an image, the controller 180 can control the transparent display 430 to output the previously outputted image in a form of PIP (picture in picture) together with the newly received image.

Among the items mentioned earlier in FIG. 12a, if an item making an identical operation to be performed for a prescribed time is selected, it is necessary to display the prescribed time for a user. Regarding this, it shall be described with reference to FIG. 12b in the following.

Figure 12B:
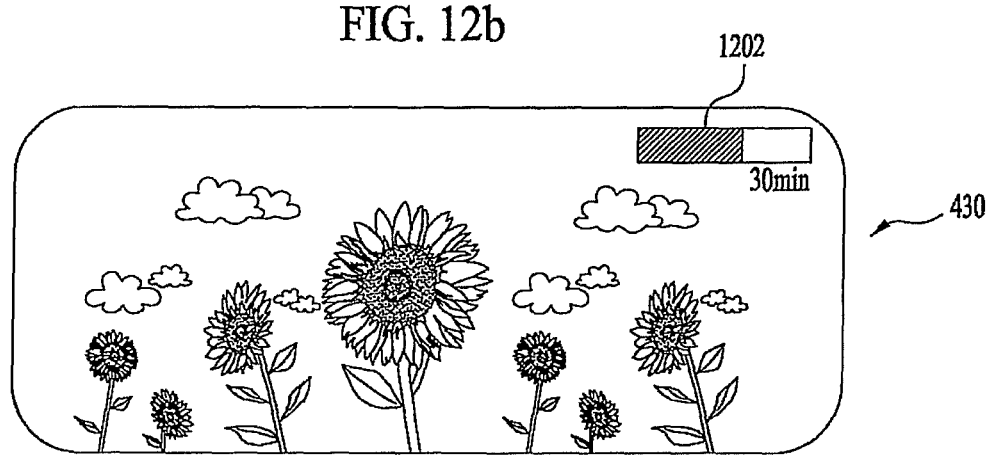
FIG. 12b is a diagram for an example of a method of guiding a setting time for a user via the transparent display 430 in case that an identical operation is configured to be performed for a prescribed time for a transceived image.

FIG. 12b is a diagram for an example of a method of guiding a setting time for a user via the transparent display 430 in case that an identical operation is configured to be performed for a prescribed time for a transceived image.

Referring to FIG. 12b, if an identical operation is configured to be performed for a prescribed time for a transceived image, the controller 180 can output a setting time indicator 1202 informing a user of a set time via the transparent display 430. The setting time indicator 1202 can display a ratio of total setting time to currently remaining time.

If a command for updating time is received, the controller 180 can perform the identical operation again for a prescribed time on the basis of timing of receiving the command. As an example of the command for updating time, there may exists an input for selecting the shoot/capture button 411 after a user gazes at the setting time indicator 1202 for more than a prescribed time.

FIG. 13a and FIG. 13b are diagrams for a method of transmitting a capture image of a screen outputted from an external device to a different external device according to one embodiment of the present invention.

If an image of a screen outputted from the first external device 601 is captured and a command for transmitting the captured image to a second external device 602 is received, the controller 180 receives the captured image from the first external device 601 and can transmit the received captured image to the second external device 602.

In this case, the command may correspond to a long-press input inputted on the shoot/capture button 411. In particular, the input may correspond to the long-press input, which is received when the first external device 601 is targeted and released when the second external device 602 is targeted.

More specifically, as depicted in FIG. 13a (a), if the long-press input on the shoot/capture 411 is received when the first external device 601 is targeted, the controller 180 can receive a capture image from the first external device 601. The capture image received from the first external device 601 corresponds to a capture image of a screen outputted from the first external device 601. And, as depicted in FIG. 13a (b), the controller can display a preview 801 of the received capture image in one area of the transparent display 430. While the long-press input is maintained, the controller 180 can continuously maintain the display of the preview 801.

Subsequently, while the long-press input is maintained, the controller 180 can target the second external device 602 (FIG. 13a (c)). If the long-press input is released when the second external device 602 is targeted, the controller 180 can transmit the capture image received from the first external device 601 to the second external device 602 (FIG. 13b (a)).

And, as depicted in an example of FIG. 13b (b), the controller 180 can output an animation effect 1102 showing that the capture image is transmitted to the second external device 602.

According to one embodiment of the present invention, if the capture image received from the first external device 601 is delivered to the second external device 602, the controller can control power of the first external device 601 to be automatically turned off.

Meanwhile, although the embodiment mentioned earlier with reference to FIG. 11 and FIG. 13 has explained a case that one external device is targeted only, according to one embodiment, a plurality of external devices can be targeted. Regarding this, it shall be described with reference to FIG. 14a and FIG. 14b in the following.

FIG. 14a and FIG. 14b are diagrams for a method of transmitting a camera image obtained by a camera 428 to a plurality of external devices according to one embodiment of the present invention.

In a controlling method according to one embodiment of the present invention, if a command for transmitting a camera image is received, the controller 180 obtains a camera image corresponding to an image taken by the camera 428 and transmits the obtained image to a plurality of targeted external devices.

The controlling method is explained in detail with reference to the attached drawing. Referring to FIG. 14a (a), a shape of a person 1101 is seen via the transparent display 430. If a long-press input inputted on the shoot/capture button 411 is received, the controller 180 obtains a camera image for the person 1101 via the camera 428 and can display a preview 801 for the camera image in one area of the transparent display 430. If the received long-press input is continuously maintained, the controller 180 can maintain the display of the preview 801. Targeting on a plurality of external devices 601/602 can be performed while the long-press input is maintained. A method of performing the targeting is identical to what is mentioned in the foregoing description. Specifically, the targeting can be performed in a manner that a gaze of a user stays at a first and a second external device for more than a prescribed time, respectively.

After the targeting is performed for the first and the second external device, respectively, if the long-press input is released, the controller 180 can transmit the camera image to the targeted first and the second external device 601/602 (FIG. 14b (a)).

And, as depicted in an example of FIG. 14b (b), the controller 180 can output an animation effect 1102 showing that the camera image is transmitted to the first and the second external device 601/602.

FIG. 15 is a diagram for an example of a method of displaying information on an item included in a camera image among controlling methods according to one embodiment of the present invention.

Referring to FIG. 15 (a), a shape of a ladies' bag 1501 is seen via the transparent display 430. As depicted in FIG. 15 (a), if a command for taking a picture of an image is received, the controller 180 can obtain a camera image using the camera 428.

After the camera image is obtained, the controller 180 can output a selection pop-up window 1502 for a following operation of the camera image. The selection pop-up window 1502 includes items indicating whether to store the camera image or whether to search for information on an item included in the camera image.

If an item configured to search for information on an item is selected, the controller 180 identifies the item and can obtain the information on the item in a manner of performing a web search, a database search or the like. And, the controller 180 can control the transparent display 430 to display the obtained information 1503.

Meanwhile, in the embodiment mentioned earlier with reference to FIG. 15, although the operation of searching for additional information on the identified item and the operation of displaying the addition information are executed after the command for taking a picture of an image is received, by which the present invention may be non-limited. The controller 180 sequentially identifies items using camera images obtained by the camera 428 in real time and additional information on the items can be searched and displayed using the method mentioned in the foregoing description.

Figure 16:
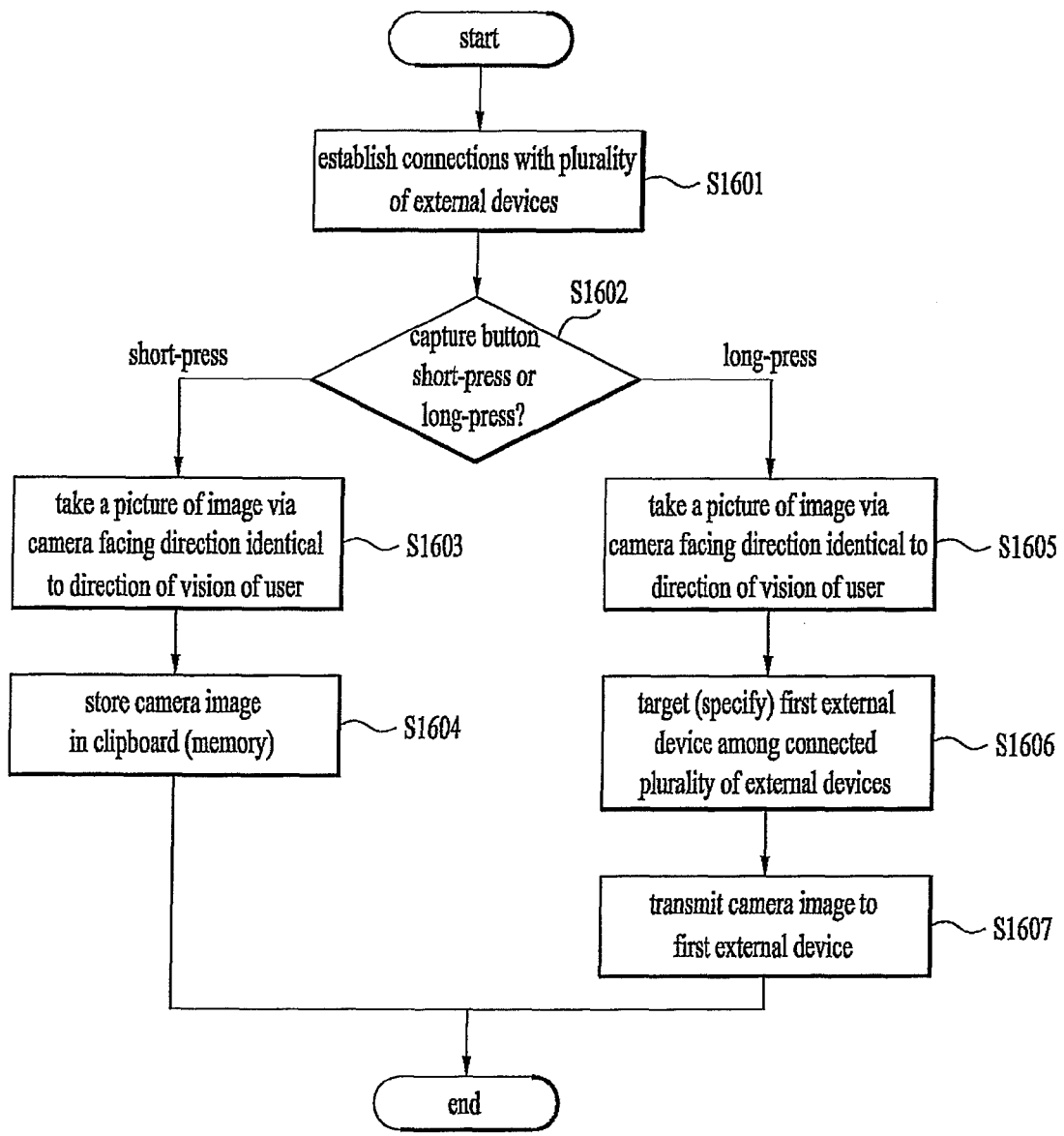
FIG. 16 is a flowchart for a method of storing a camera image or a method of transmitting the camera image to a different external device according to one embodiment of the present invention.

FIG. 16 is a flowchart for a method of storing a camera image or a method of transmitting the camera image to a different external device according to one embodiment of the present invention.

In the step S1601, the controller 180 can establish connections with a plurality of external devices. The step S1601 can be omitted depending on a type of a wireless communication technology used for connecting an external device. Since the step S1601 may correspond to a step performed on a moment of transceiving data only, an order of the step may be modified.

In the step S1602, the controller 180 determines whether an input inputted on the shoot/capture button 411 corresponds to a short-press input or a long-press input. If the short-press input is received, it may proceed to the step S1603. If the long-press input is received, it may proceed to the step S1605.

The step S1603 and the step S1604 corresponding to the steps of inputting the short-press input on the shoot/capture button 411 correspond to an operation of storing a camera image mentioned earlier with reference to FIG. 5.

In the step S1603, the controller 180 can take a picture of an image using the camera 428. Since a direction of the camera 428 is identical to a direction at which a vision of a user is facing, the camera image can be matched with the vision of the user.

In the step S1604, the controller 180 can store the camera image taken in the step S1603 in the memory 160.

The step S1605 to the step S1607 corresponding to the steps of inputting the long-press input on the shoot/capture button 411 correspond to an operation of transmitting the camera image to a different external device mentioned earlier with reference to FIG. 11a and FIG. 11b.

In the step S1605, the controller 180 can take a picture of an image using the camera 428. Since a direction of the camera 428 is identical to a direction at which a vision of a user is facing, the camera image can be matched with the vision of the user.

In the step S1606, the controller 180 can target a first external device among a plurality of the connected external devices. As mentioned in the foregoing description, targeting can be performed based on the vision of the user.

In the step S1607, the controller 180 can transmit the camera image to the first external device.

Figure 17:
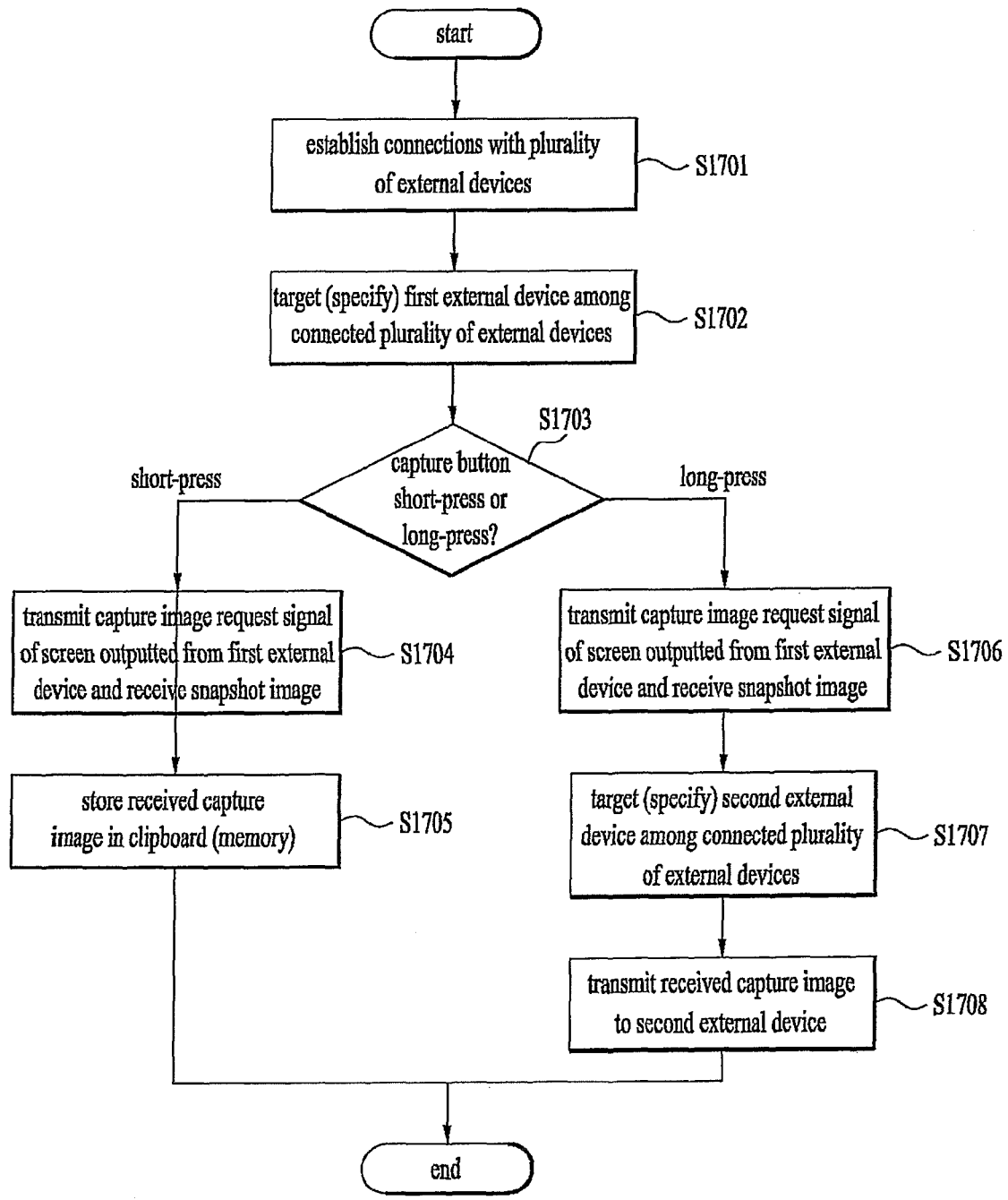
FIG. 17 is a flowchart for a method of storing a captured image or a method of transmitting the captured image to a different external device according to one embodiment of the present invention.

FIG. 17 is a flowchart for a method of storing a capture image or a method of transmitting the capture image to a different external device according to one embodiment of the present invention.

In the step S1701, the controller 180 can establish connections with a plurality of external devices. Similar to the step S1601, the step S1701 can be omitted depending on a type of a wireless communication technology used for connecting an external device. Since the step S1701 may correspond to a step performed on a moment of transceiving data only, an order of the step may be modified.

In the step S1702, the controller 180 can target a first external device among a plurality of the connected external devices. As mentioned in the foregoing description, targeting can be performed based on a vision of a user.

In the step S1703, the controller 180 determines whether an input inputted on the shoot/capture button 411 corresponds to a short-press input or a long-press input. If the short-press input is received, it may proceed to the step S1704. If the long-press input is received, it may proceed to the step S1706.

The step S1704 and the step S1705 corresponding to the steps of inputting the short-press input on the shoot/capture button 411 correspond to an operation of storing a capture image received from the first external device 601 mentioned earlier with reference to FIG. 8.

In the step S1704, the controller 180 can control the wireless communication unit 110 to transmit a capture image request signal requesting a capture image of a screen outputted from the specified first external device to the first external device. And, the controller 180 can control the wireless communication 110 to receive a capture image, which is transmitted by the first external device in response to the capture image request signal.

In the step of S1705, the controller 180 can store the camera image of the step S1704 in the memory 160.

The step S1706 to the step S1708 corresponding to the steps of inputting the long-press input on the shoot/capture button 411 correspond to an operation of transmitting the camera image to a different external device mentioned earlier with reference to FIG. 13a and FIG. 13b.

In the step S1706, the controller 180 can control the wireless communication unit 110 to transmit a capture image request signal requesting a capture image of a screen outputted from the specified first external device to the first external device. And, the controller 180 can control the wireless communication 110 to receive a capture image, which is transmitted by the first external device in response to the capture image request signal.

In the step S1707, the controller 180 can target a second external device among a plurality of the connected external devices. As mentioned in the foregoing description, targeting can be performed based on a vision of a user.

In the step S1708, the controller 180 can transmit the capture image received from the first external device to the first external device.

So far, "first operation mode" according to one embodiment of the present invention has been explained with reference to FIG. 5 to FIG. 17. In the following, "second operation mode" according to one embodiment of the present invention is explained.

Figure 18:
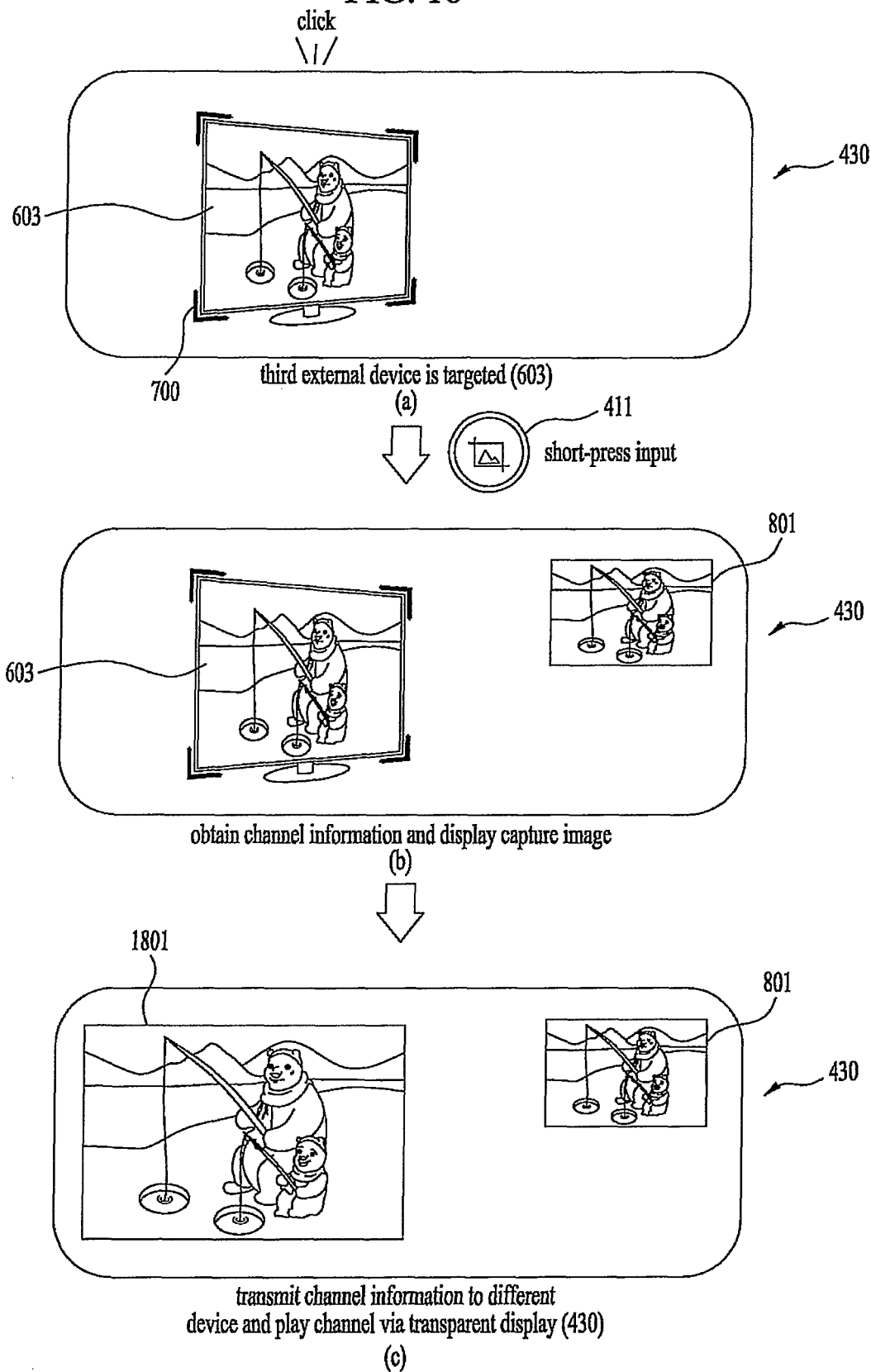
FIG. 18 is a diagram for a method of obtaining broadcast channel information outputted from an external device and playing a broadcast via a transparent display based on the obtained broadcast channel information according to one embodiment of the present invention.

FIG. 18 is a diagram for a method of obtaining broadcast channel information outputted from an external device and playing a broadcast via a transparent display based on the obtained broadcast channel information in the "second operation mode" according to one embodiment of the present invention.

Referring to FIG. 18 (a), a prescribed broadcast program is playing in a third external device 603 and the third external device is targeted by the wearable device 400. If a command for receiving channel information is inputted, the controller 180 can control the wireless communication unit 110 to request/receive the channel information to/from the third external device 603. As an example of the command for receiving the channel information, there may exist a short-press input inputted on the shoot/capture button 411.

The channel information indicates channel identification information necessary for identifying a broadcast channel.

The channel information is explained in more detail with reference to the attached drawing. If the command for receiving the channel information is received, the controller 180 can receive a capture image of a currently outputted screen together with information on a broadcast channel outputted from the targeted third external device 603. And, as depicted in FIG. 18 (b), the controller 180 can output the received capture image in one area of the transparent display 430.

If a command for outputting the broadcast program is received, the controller 180 identifies a broadcast based on the received channel information and can output the identified broadcast via the transparent display 430. As an example of the command for outputting the broadcast program, according to one embodiment of the present invention, the command may correspond to an input of gazing at the capture image displayed in one area of the transparent display 430 for more than a prescribed time. In particular, the command may correspond to an input that a vision of the user stays on the capture image, which is displayed in one area of the transparent display 430, for more than a prescribed time.

Meanwhile, one embodiment of the present invention intends to provide a controlling method capable of transmitting a broadcast to a different external device as well as a controlling method capable of playing the broadcast in the wearable device 400 itself. Regarding this, it shall be explained with reference to FIG. 19 in the following.

FIG. 19 is a diagram for an example of a method of delivering received channel information to a different external device according to one embodiment of the present invention.

Referring to FIG. 19 (a), assume that channel information is received using a method identical to the method explained in FIG. 18. And, the controller 180 displays a capture image for a channel in one area of the transparent display 430.

If a command for transmitting channel information to an external device is received, the controller 180 controls the wireless communication unit 110 to transmit the received channel information to a targeted external device.

Specifically, if a long-press input inputted on the shoot/capture button 411 is received, the first external device 601 is targeted while the input is maintained and then the long-press input is released, the controller 180 can deliver the channel information to the targeted first external device (refer to FIG. 19 (b)).

And, the controller 180 displays a guide message indicating that the channel information is successfully delivered and can output an animation effect 1901 showing that the channel information is transmitted.

Meanwhile, in the processes of FIG. 18 and FIG. 19, although the operation of delivering the channel information to a different external device has been explained in a manner of being classified into a short-press operation and a long-press operation, the operation of delivering the channel information can be performed by one input. For instance, as depicted in FIG. 18, when the third external device is targeted, if a long-press input is received, the first external device is targeted while the input is maintained, and then the long-press input is released, the controller 180 can deliver the channel information received from the third external device 603 to the first external device 601.

So far, a method of transmitting a capture image and a camera image to a different external device has been explained. In the following, an operation of transmitting an image stored in the memory 160 of the wearable device 400 is explained.

FIG. 20 is a diagram for a method of transmitting an image stored in a memory 160 of a wearable device 400 according to one embodiment of the present invention.

Referring to FIG. 20 (a), the controller 180 outputs an execution state of a gallery application via the transparent display 430. The gallery application may indicate an application used for reading images stored in the memory 160. According to one embodiment of the present invention depicted in FIG. 20 (a), the gallery application can output one or more image thumbnails 2001 and check boxes 2002 for each of the image thumbnails 2001. The check boxes 2002 can be switched to a checked/released state according to a check/release command of a user. The controller 180 can select an image in a manner of checking at least one check box among the image thumbnails outputted in the gallery application according to the check/release command of the user.

After an image is selected, if a command for transmitting the selected image is received, the controller 180 can output a preview 2003 for the selected image. As an example, the command for transmitting the selected image may correspond to a long-press input inputted on the shoot/capture button 411.

More specifically, when at least one picture is selected, if the long-press input is received, the first external device is targeted while the input is maintained and then the long-press input is released, the controller 180 can transmit the selected at least one picture to the targeted first external device 601 (refer to FIG. 20 (b)).

And, as depicted in FIG. 20 (c), the controller 180 can output an animation effect 2004 showing that the picture has been transmitted via the transparent display 430.

Advantages and effectiveness of a mobile terminal according to the present invention and a method of controlling therefor are explained in the following.

According to at least one of embodiments of the present invention, it is able to provide a wearable device of a glasses form using a limitative user input means and providing an efficient controlling method.

And, according to at least one of embodiments of the present invention, it is able to provide a wearable device of a glasses form enabling a user to obtain various kinds of images and easily deliver the obtained image.

And, according to at least one of embodiments of the present invention, it is able to provide a wearable device of a glasses form easily specifying a target external device, which becomes a target of transmitting and receiving an image, in a manner of detecting a movement of eyes of a user, a position of the eyes or a direction at which the wearable device is facing.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising
a frame configured to be provided on a user;
a transparent display to display information;
a wireless communication unit configured to transceive data with at least one external device;
a camera to obtain a first image;
an input unit having a capture button, and the input device to receive a first input via the capture button; and
a controller configured to:
obtain the first image in response to receiving the first input by pressing of the capture button and continuously maintaining the first input by maintaining the pressing of the capture button,
automatically select a first external device when gazing at the first external device for more than a prescribed time based on at least one of a point of gaze of a user or a direction of a head of the user while the first input is continuously maintained by pressing of the capture button,
control the wireless communication unit to transmit the first image obtained by the camera to the selected first external device in response to releasing the first input by releasing the pressing of the capture button, and
control the transparent display to display, at a display position corresponding to the selected first external device, a focus indicator indicating that the first external device is automatically selected.

2. The mobile terminal of claim 1, further comprising a memory configured to store an image,
wherein the controller is configured to control the wireless communication unit to receive, from a selected second external device, a second image corresponding to a captured image of a displayed screen of the selected second external device in response to receiving a second command at the input unit, and the memory to store the received second image.

3. The mobile terminal of claim 2, wherein a third input at the input unit is classified as a first input pattern or a second input pattern based on whether a duration of the third input exceeds a prescribed time, and wherein the first command corresponds to the first input pattern that is released when the first external device is selected after receiving the third input.

4. The mobile terminal of claim 3, wherein the second command corresponds to the second input pattern that is received when the second external device is selected.

5. The mobile terminal of claim 3, wherein the controller is configured to output the first image in an area of the transparent display while the first command is maintained.

6. The mobile terminal of claim 1, wherein the controller is further configured to control the wireless communication unit to receive, from a second external device, a second image corresponding to a captured image of a displayed screen of a selected second external device in response to receiving a second command at the input unit, and the controller to transmit the received second image to the selected first external device.

7. The mobile terminal of claim 6, wherein the input unit is to classify an input as a first input pattern or a second input pattern based on whether a duration of the input exceeds a prescribed time, and wherein the second command corresponds to the first input pattern that is received and maintained when the second external device is selected and is released when the first external device is selected.

8. The mobile terminal of claim 6, wherein the controller is further configured to receive channel information of a broadcast outputted from the second external device from the selected second external device in response to receiving the second command at the input unit, and the controller to deliver the received channel information to the selected first external device.

9. The mobile terminal of claim 8, wherein the input unit is configured to classify an input as a first input pattern or a second input pattern based on whether a duration of the input exceeds a prescribed time, and wherein the second command corresponds to the first input pattern that is received and maintained when the second external device is selected and released when the first external device is selected.

10. The mobile terminal of claim 1, further comprising an eye tracking sensor configured to detect at least one position of an eye of the user,
wherein the controller is further configured to determine the point of gaze based on the detected at least one position of the eye.

11. The mobile terminal of claim 1, wherein the controller is further configured to determine that the point of gaze is in a prescribed area of the first image.

12. A method of controlling a mobile terminal, comprising:
receiving, via a capture button, a first input;
obtaining a first image by a camera in response to receiving the first input by pressing of the capture button and continuously maintaining the first input by maintaining the pressing of the capture button;
automatically select a first external device when gazing at the first external device for more than a prescribed time based on at least one of a point of gaze of a user or a direction of a head of the user while the first input is continuously maintained by pressing of the capture button;
controlling a wireless communication unit to transmit the first image to the selected first external device in response to releasing the first input by releasing the pressing of the capture button; and
displaying, at a display position of a transparent display corresponding to the selected first external device, a focus indicator indicating that the first external device is automatically selected.

13. The method of claim 12, further comprising:
receiving a second command via the input unit;
receiving, from a selected second external device, a second image corresponding to a captured image of a displayed screen at the selected second external device in response to receiving the second command; and
storing the received second image in a memory.

14. The method of claim 13, wherein an input at the input unit is classified as a first input pattern or a second input pattern based on whether a duration of the input exceeds a prescribed time, and wherein the first command corresponds to the first input pattern that is released when the first external device is selected after receiving the input.

15. The method of claim 14, wherein the second command corresponds to the second input pattern that is received when the second external device is selected.

16. The method of claim 14, further comprising outputting the first image in one area of the transparent display while the first command is maintained.

17. The method of claim 12, further comprising:
receiving a second command via the input unit;
receiving, from a selected second external device, a second image corresponding to a captured image of a displayed screen at the selected second external device; and
transmitting the received second image to the selected first external device.

18. The method of claim 17, wherein an input at the input unit is classified as a first input pattern or a second input pattern based on whether a duration of the input exceeds a prescribed time, and wherein the second command corresponds to the first input pattern that is received and maintained when the second external device is selected and released when the first external device is selected.

19. The method of claim 12, further comprising:
receiving, from a selected second external device, a second command via the input unit;
receiving channel information of a broadcast outputted from the selected second external device; and
delivering the received channel information to the selected first external device.

20. The method of claim 19, wherein an input inputted via the input unit is classified as a first input pattern or a second input pattern based on whether a duration of the input exceeds a prescribed time, and wherein the second command corresponds to the first input pattern that is received and maintained when the second external device is selected and released when the first external device is selected.

21. The method of claim 12, further comprising:
detecting at least one position of an eye of the user via an eye tracking sensor; and
determining the point of gaze based on the detected position of the eye.

22. The method of claim 12, further comprising determining that the point of gaze is in a prescribed area of the first image.

* * * * *